(12) United States Patent
Goossen et al.

(10) Patent No.: US 10,725,169 B2
(45) Date of Patent: Jul. 28, 2020

(54) INTEGRATED RADAR AND ADS-B

(71) Applicant: Honeywell International Inc., Morris Plains, NJ (US)

(72) Inventors: Katherine Goossen, Albuquerque, NM (US); David C. Vacanti, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 291 days.

(21) Appl. No.: 15/808,135

(22) Filed: Nov. 9, 2017

(65) Prior Publication Data

US 2018/0246200 A1 Aug. 30, 2018

Related U.S. Application Data

(60) Provisional application No. 62/464,887, filed on Feb. 28, 2017, provisional application No. 62/547,323, filed on Aug. 18, 2017.

(51) Int. Cl.

| *G01S 13/86* | (2006.01) |
| *G01S 13/935* | (2020.01) |
| *G01S 13/933* | (2020.01) |
| *G01S 13/76* | (2006.01) |
| *G01S 13/87* | (2006.01) |
| *G01S 7/00* | (2006.01) |
| *G01S 5/00* | (2006.01) |

(Continued)

(52) U.S. Cl.
CPC ............ *G01S 13/86* (2013.01); *G01S 5/0072* (2013.01); *G01S 7/003* (2013.01); *G01S 13/765* (2013.01);

(Continued)

(58) Field of Classification Search
CPC ........ G01S 13/86; G01S 13/94; G01S 13/765; G01S 13/87; G01S 7/003; G01S 5/0072;
(Continued)

(56) References Cited

U.S. PATENT DOCUMENTS 5,061,930 A * 10/1991 Nathanson .............. F41G 7/224
244/3.19
6,792,058 B1 * 9/2004 Hershey ................ G01S 13/782
375/267

(Continued)

FOREIGN PATENT DOCUMENTS

EP 2442133 A1 4/2012
WO WO2010/012842 A1 * 2/2010 ............... G01S 7/40

OTHER PUBLICATIONS

Response to Extended Search Report dated Jul. 25, 2018, from counterpart European Application No. 18158710.6, filed Nov. 21, 2018, 18 pp.

(Continued)

*Primary Examiner* — Bernarr E Gregory
(74) *Attorney, Agent, or Firm* — Shumaker & Sieffert, P.A.

(57) ABSTRACT

In some examples, a system is configured to mount on an ownship vehicle and includes a phased-array radar device configured to transmit radar signals and receive returned radar signals. In some examples, the system also includes a surveillance transponder configured to receive surveillance signals from another vehicle. In some examples, the system further includes processing circuitry configured to detect an object based on the returned radar signals and determine a position of the other vehicle and a velocity vector of the other vehicle based on the received surveillance signals. In some examples, the system includes common signal and data processing circuitry that processes both data from the phased-array radar device and data from the surveillance transponder.

20 Claims, 13 Drawing Sheets

(51) Int. Cl.
*G08G 5/00* (2006.01)
*G01S 13/78* (2006.01)
*G01S 19/03* (2010.01)
*G01S 13/931* (2020.01)
*G01S 7/02* (2006.01)
*G01S 13/44* (2006.01)
*G01S 13/02* (2006.01)
*G01S 13/00* (2006.01)

(52) U.S. Cl.
CPC ............ *G01S 13/781* (2013.01); *G01S 13/87* (2013.01); *G01S 13/933* (2020.01); *G01S 13/935* (2020.01); *G01S 19/03* (2013.01); *G08G 5/0021* (2013.01); *G01S 13/4454* (2013.01); *G01S 2007/028* (2013.01); *G01S 2013/0245* (2013.01); *G01S 2013/932* (2020.01); *G01S 2013/9316* (2020.01); *G01S 2013/9322* (2020.01)

(58) Field of Classification Search
CPC .... G01S 13/781; G01S 19/03; G01S 13/9303; G01S 2013/936; G01S 2007/028; G01S 13/4454; G01S 2013/9353; G01S 2013/9357; G01S 2013/0245; G01S 7/40; G01S 13/782; G01S 13/935; G01S 13/933; G01S 2013/9322; G01S 2013/9316; G01S 2013/932; G08G 5/0021; F41G 7/007; F41G 7/224
See application file for complete search history.

(56) References Cited

U.S. PATENT DOCUMENTS

| | | | |
|---|---|---|---|
| 7,414,567 B2 | 8/2008 | Zhang et al. | |
| 7,761,196 B2* | 7/2010 | Brandao | G01S 13/9303 701/14 |
| 8,054,215 B2* | 11/2011 | Abbett | G01S 13/765 342/36 |
| 8,368,584 B2 | 2/2013 | Askelson et al. | |
| 8,378,881 B2* | 2/2013 | LeMire | G01S 13/87 342/59 |
| 8,643,534 B2* | 2/2014 | Margolin | G01S 13/9303 342/146 |
| 9,465,104 B2 | 10/2016 | Margolin | |
| 10,126,100 B2* | 11/2018 | Bonen | F41G 7/007 |
| 10,302,759 B1* | 5/2019 | Arteaga | G01S 19/03 |
| 2008/0150784 A1* | 6/2008 | Zhang | G01S 13/86 342/30 |
| 2009/0273504 A1* | 11/2009 | Meyers | G01S 13/86 342/42 |
| 2014/0028485 A1 | 1/2014 | Nordlie et al. | |
| 2017/0104276 A1 | 4/2017 | Vacanti et al. | |
| 2017/0160389 A1 | 6/2017 | Vacanti | |

OTHER PUBLICATIONS

Extended Search Report from counterpart European Application No. 18158710.6, dated Jul. 25, 2018, 8 pp.
Delittle et al., "Advanced Solutions for Integrated Surveillance," THALES, May 11-13, 2010, 16 pp.
Ramasamy et al., "A Novel Approach to Cooperative and Non-Cooperative RPAS Detect-and-Avoid," ResearchGate, Sep. 2015, 10 pp.
U.S. Appl. No. 15/253,494, by Honeywell International Inc. (Inventors: Wang et al.), filed Aug. 31, 2016.
U.S. Appl. No. 15/253,471, by Honeywell International Inc. (Inventors: Vacanti et al.), filed Aug. 31, 2016.
U.S. Appl. No. 15/457,844, by Honeywell International Inc. (Inventor: David C. Vacanti), filed Mar. 13, 2017.
Examination Report from counterpart European Application No. 18158710.6, dated May 13, 2020, 5 pp.

* cited by examiner

INTEGRATED RADAR AND ADS-B

This application claims the benefit of U.S. Provisional Patent Application No. 62/464,887 (filed Feb. 28, 2017) and the benefit of U.S. Provisional Patent Application No. 62/547,363 (filed Aug. 18, 2017), both of which are incorporated by reference herein.

TECHNICAL FIELD

This disclosure relates to radar systems.

BACKGROUND

A Frequency Modulated Continuous Wave (FMCW) phased-array radar device may include an antenna array, where each antenna is configured to transmit or receive electromagnetic signals. The FMCW phased-array radar device may control the direction of a beam of electromagnetic signals that is transmitted by the antenna array. The direction of the beam may be based on the phase relationship (i.e., phase shift) of the electromagnetic signals transmitted from each element of the antenna array. Each element of the antenna array may include a separate transmitter and/or receiver to generate a digitally generated phase shift. The digitally generated phase shift is achieved at low intermediate frequencies and does not occur at the carrier frequency of the radar. This radar is therefore known as a Digital Active Phased Array Radar (DAPA).

An FMCW phased-array radar device may include electronic scanning rather than or in addition to mechanical scanning. The electronic scanning may include generating a digitally generated phase shift in the electromagnetic signals transmitted by the antenna array to control the direction of a beam. The electronic scanning may also include determining a digitally generated phase shift in electromagnetic signals received by the antenna array. In some examples, an FMCW phased-array radar device may include a mechanical scanning apparatus for moving, tilting, and/or rotating the antenna array in one plane.

SUMMARY

This disclosure describes a system including a phased-array radar device, and surveillance transponder, and common processing circuitry configured to handle the return signals. The phased-array radar device may be configured to transmit and receive radar signals in order to detect objects. The surveillance transponder may be configured to transmit and/or receive surveillance signals, where the surveillance signals indicate the position and velocity of the transmitter. The common processing circuitry may be configured to control both devices (e.g., the phased-array radar device and the surveillance transponder) and process signals from both devices. The common processing circuitry may also be configured to generate outbound radar signals for transmission by the phased-array radar device and generate outbound surveillance signals for transmission by the surveillance transponder.

In some examples, a system is configured to mount on an ownship vehicle and includes a phased-array radar device configured to transmit radar signals and receive returned radar signals. The system also includes a surveillance transponder configured to receive surveillance signals from another vehicle. The system further includes processing circuitry configured to detect an object based on the returned radar signals and determine a position of the other vehicle and a velocity vector of the other vehicle based on the received surveillance signals. The processing circuitry includes common signal and data processing circuitry configured to process data from the phased-array radar device and process data from the surveillance transponder.

In some examples, a method includes transmitting, by a phased-array radar device, radar signals and receiving, by the phased-array radar device, returned radar signals. The method also includes transmitting, by a surveillance transponder, surveillance signals indicating a position of an ownship vehicle. The method further includes receiving, by the surveillance transponder, surveillance signals from another vehicle. The method includes detecting, at processing circuitry, an object based on the returned radar signals. The method further includes determining, at the processing circuitry, a position of the other vehicle and a velocity vector of the other vehicle based on the received surveillance signals.

In some examples, a system is configured to mount on an ownship vehicle and includes a phased-array radar device configured to transmit radar signals and receive returned radar signals. The system also includes a surveillance transponder configured to receive surveillance signals from another vehicle. The system further includes a positioning device configured to receive positioning signals and processing circuitry configured to determine the position of the ownship vehicle based on the positioning signals. The processing circuitry is further configured to detect an object based on the returned radar signals, determine a position of the other vehicle and a velocity vector of the other vehicle based on the received surveillance signals or the received returned radar signals, and cause the ownship vehicle to take an evasive maneuver based on a position of the object or the position of the other vehicle. The processing circuitry includes common signal and data processing circuitry configured to process data from the phased-array radar device, process data from the positioning device, and process data from the surveillance transponder.

DETAILED DESCRIPTION

Figure 1:
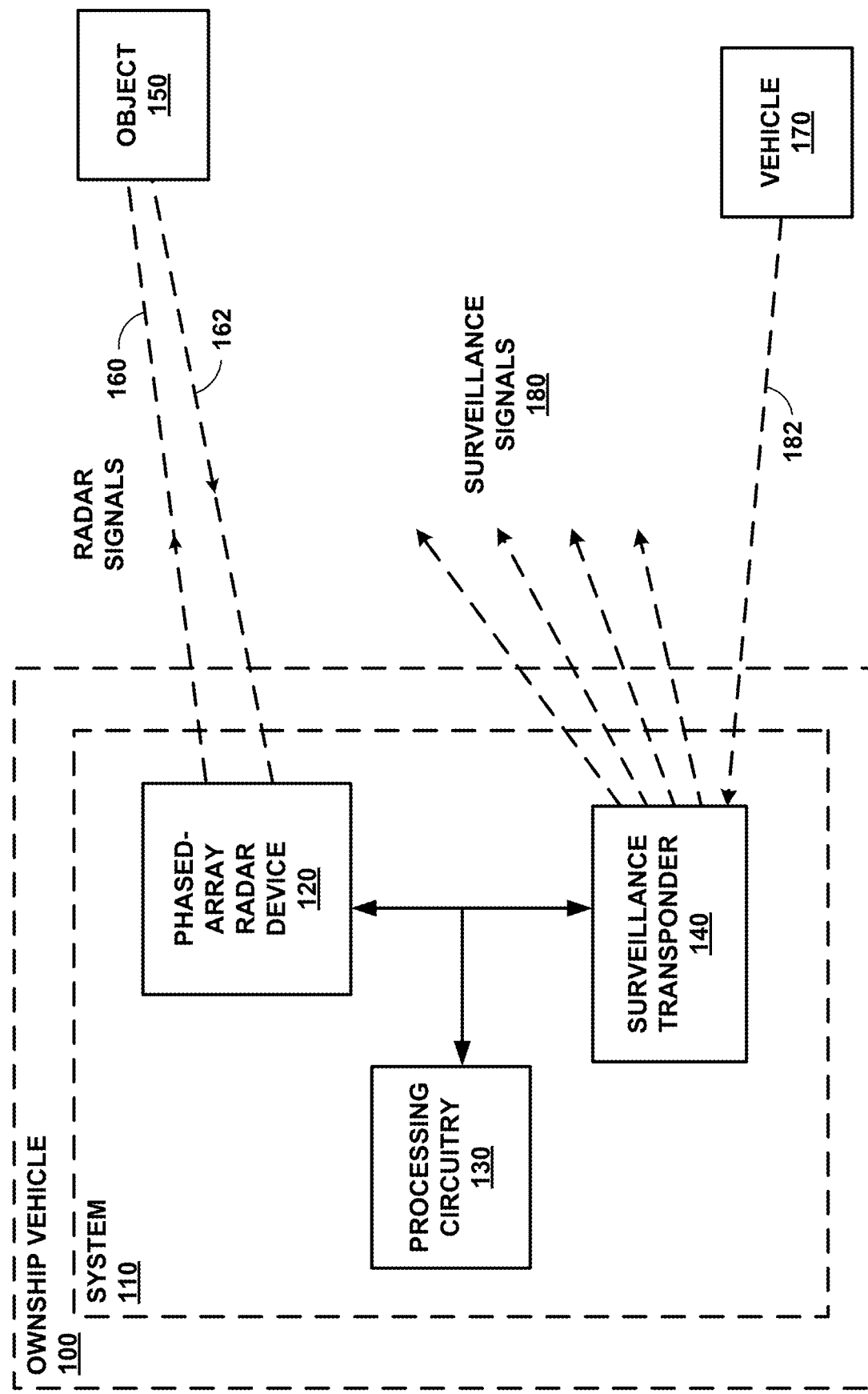
FIG. 1 is a conceptual block diagram depicting a system including a phased-array radar device, processing circuitry, and a surveillance transponder, in accordance with some examples of this disclosure.

This disclosure describes a system including radar functionality and surveillance functionality with common processing circuitry. The system may include a phased-array radar device configured to detect obstacles. The phased-array radar device may be configured to transmit radar signals at relatively high frequencies, e.g., twenty-four gigahertz (e.g., K band), with relatively short wavelengths, as compared to L-band signals (e.g., one gigahertz). The relatively short wavelengths of the radar signals may allow for smaller antenna elements and tighter spacing between antenna elements between the antenna elements, as compared to existing radar systems that transmit and receive signals with lower frequencies.

In addition, the system may include processing circuitry configured to receive the signals from both the phased-array radar device and from the surveillance transponder (e.g., common signal and data processing circuitry configured to process data from a phased-array radar device and from a surveillance transponder). The processing circuitry may be configured to determine the location of obstacles based on the return signals received from the phased-array radar device. The processing circuitry may also be configured to determine the location of vehicles based on surveillance signals received from the surveillance transponder. In some examples, the system may also include common memory device(s) configured to store data indicating obstacles sensed by the phased-array radar device and data indicating vehicles from which the surveillance transponder has received surveillance signals.

The common signal and data processing circuitry may be configured to control the various functions of the system, which may enable functionality beyond existing systems. For example, if the processing circuitry receives a surveillance signal indicating the position of another vehicle, the processing circuitry may be configured to analyze the reflected radar signals from the phased-array radar device to confirm the position of the other vehicle. If the processing circuitry determines the position of an object based on reflected radar signals, the processing circuitry may be configured to determine if the size, shape, and movement of the object are similar to characteristics of vehicles that may be stored to a memory device. If the processing circuitry determines that the object may be a vehicle based on the reflected radar signals, the processing circuitry may be configured to analyze received surveillance signals to determine if the object is a cooperative vehicle. In some examples, the processing circuitry may be also configured to cause the surveillance transponder to interrogate the object to determine if the object is a cooperative vehicle.

The processing circuitry may be configured to evaluate if the coordinates and speed of a detected object, as measured by the radar device, match the coordinate data and the speed data received by the surveillance transponder. The processing circuitry may be configured to determine that the detected object, as sensed by the radar device, is the same target as a vehicle that has transmitted surveillance signals to the surveillance transponder onboard the ownship vehicle. Therefore, the processing circuitry may determine that the target vehicle is cooperative. At that point, the processing circuitry may be configured to elect to stop tracking the cooperative target with the radar device but continue with the cooperative system (e.g., the surveillance transponder) to conserve radar scan time resources for non-cooperative targets.

It may be advantageous to have a single processor that is configured to track cooperative targets and non-cooperative targets. With a single processor, there may be no need for messaging between separate processors at each sensor (e.g., the radar device and the surveillance transponder). Messaging between separate processors may include serial data transfer between the sensors that causes timing and other concerns. By using a single processor for both sensors, a single memory device may be configured to store the tracking data for cooperative and non-cooperative targets. The data received by the radar device and the surveillance transponder and processed by the processing circuitry may refresh the data stored to the single memory device. A configuration including a single processor and a single memory device eliminates the need for a second memory bank, a second processor, and a serial data interface.

The common processing circuitry may be more effective at distinguishing between objects and vehicles because of the interplay between the devices of the system, such as the phased-array radar device and the surveillance transponder. For an existing system that includes separate processing circuitry for radar signals and separate processing circuitry for surveillance signals (e.g., discrete systems for radar and surveillance). It may be more difficult for an existing system without common processing circuitry to detect and distinguish between objects and vehicles.

An airborne collision avoidance system may use traditional air to air collision avoidance methods such as Traffic Collision and Avoidance System (TCAS) or new aircraft position location systems such as Automatic Dependent Surveillance-Broadcast (ADS-B) to provide cooperative means to avoid air to air collisions. However, not all aircraft provide cooperative transponders such as TCAS or ADS-B on board. As a result, the FMCW DAPA radar system is required to detect and track those airborne targets that are non-cooperative and are not carrying TCAS or ADS-B. As a result, the processing circuitry may be configured to blend both cooperative tracks from TCAS and ADS-B with non-cooperative tracks from a DAPA radar so that the DAPA radar may spend tracking resources on only the non-cooperative targets. This blending of tracks is best done if the same processing circuitry and system memory is used to collect and process data from both the FMCW DAPA radar and the traditional cooperative sensors.

Figure 6A:
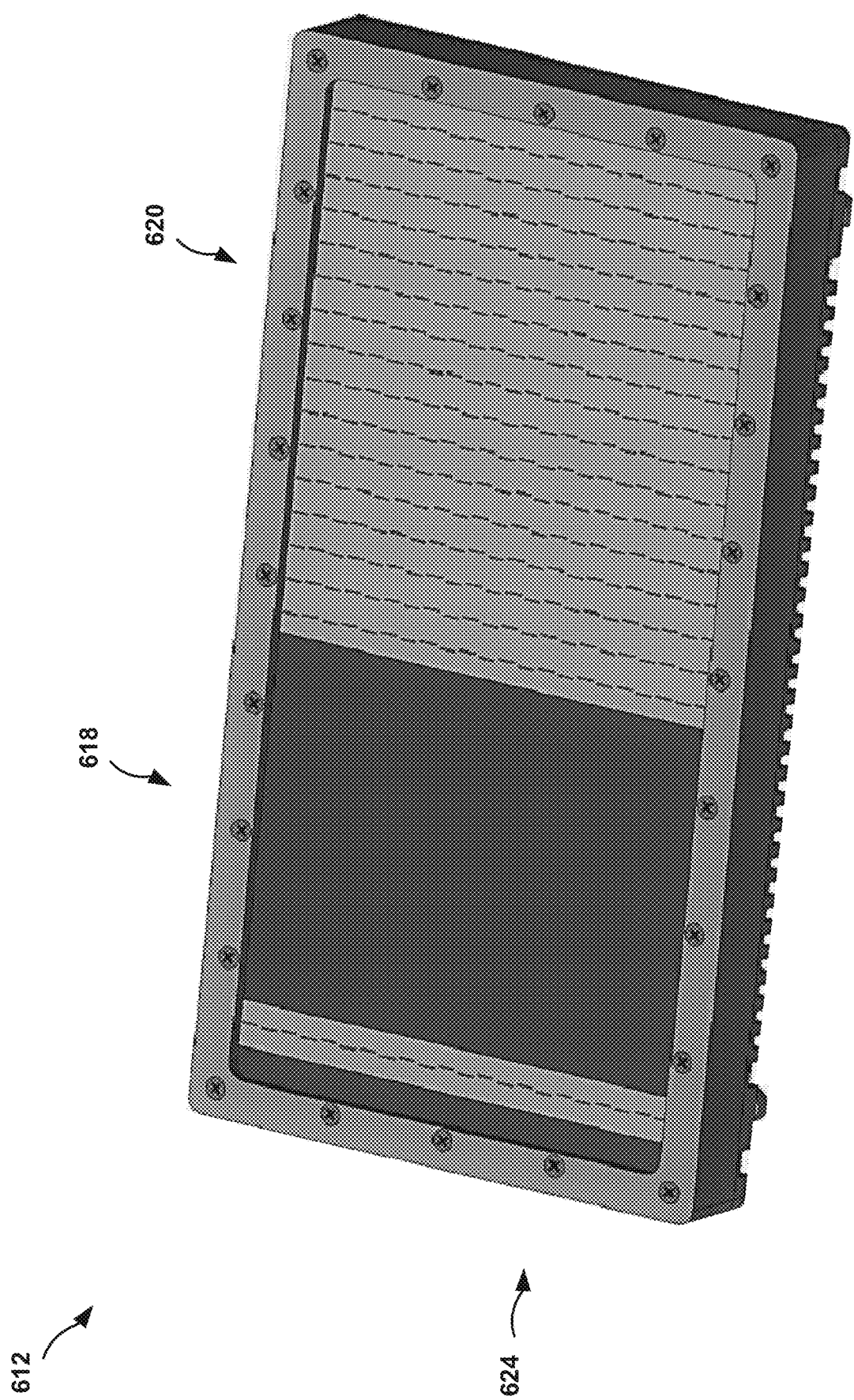
FIGS. 6A and 6B depict example hardware configurations for phased-array radar device 120.
Figure 6B:
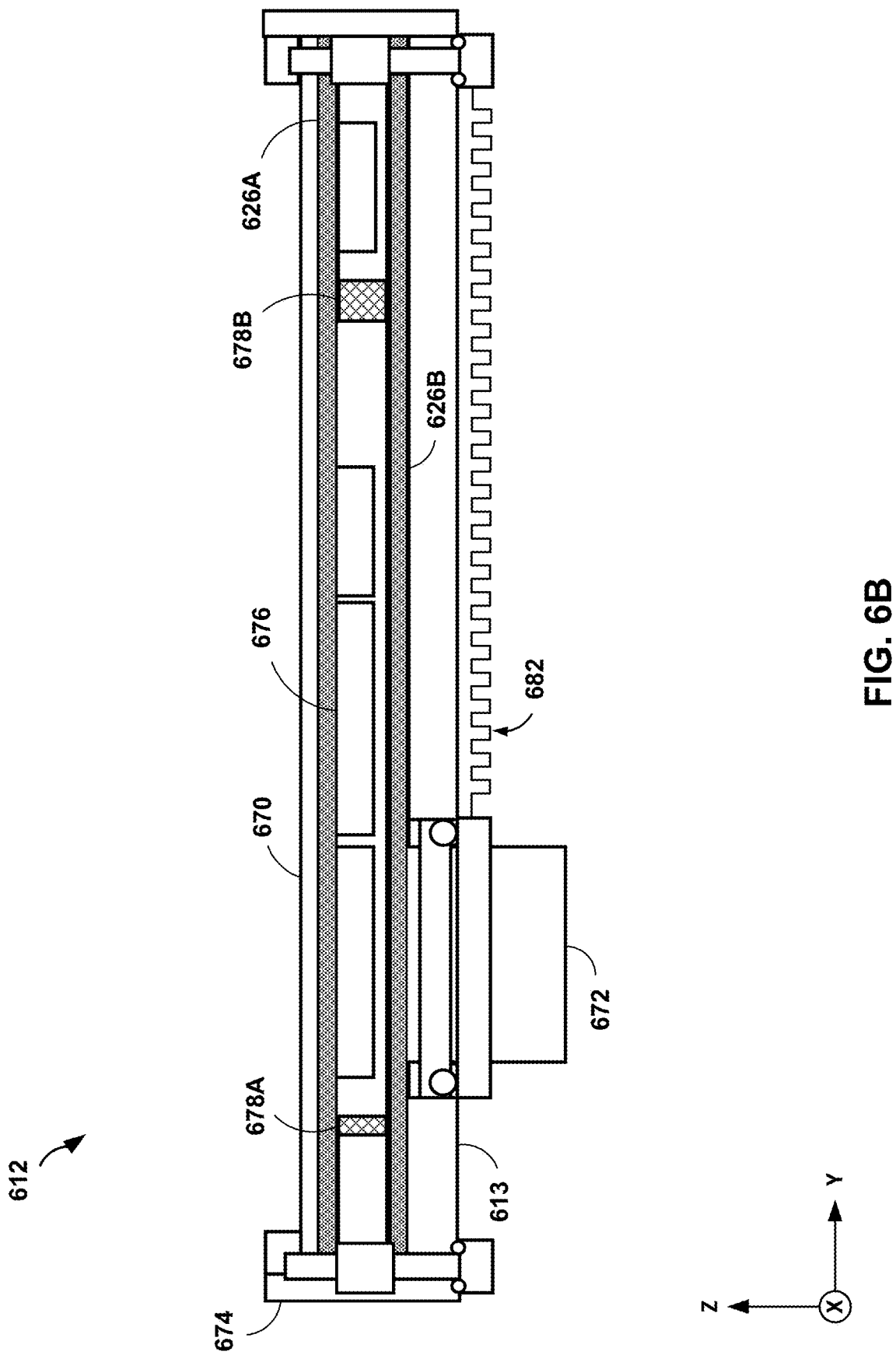

There are two forms of the DAPA radar. The first Full DAPA system may be configured to use electronic beam scanning on transmit and digital phase shifting methods on transmit. The full DAPA radar may also be configured to use Digital intermediate-frequency (IF) beam steering methods in one plane for electronic beam steering in one plane on receive and the application of complex weights to I/Q quadrature samples to both create new digitally formed beams and electronic beam steering in the second plane. This full version of DAPA is capable of forming up to twelve simultaneous beams on receive, where each beam is capable of full monopulse tracking. FIGS. 6A and 6B depict a smaller version of DAPA, known as DAPA Lite.

DAPA Lite may be configured to reuse the dual-antenna architecture of the full version of DAPA and digital phase shifting at IF frequencies to electronically steer in one plane on receive. DAPA Lite may not be configured to use digital beam steering or digital beam forming in the second plane on receive. On both transmit and receive, both beams may be scanned over a modest range of three beam widths or more up (or to one side), zero or baseline position and over a modest range of three beam widths or more below (or to the opposite side). This is achieved via alternate bulk effect scanning methods that may use distributed electronically tuned devices such as, but not limited to, varactors or PIN (p-type, intrinsic, n-type) diodes. Thus, DAPA Lite may be configured to use a greatly simplified second plane beam steering that allows modest beam scanning of three beam widths or more in one plane and full electronic beam steering in the other principal plane. DAPA Lite generates three beams on receive, but these are azimuth, elevation, and sum beams for monopulse tracking. All of these tracking beams may be formed in the direction of the main sum beam. This simplification allows a very simple electronically steered radar for applications in which very small size and weight are paramount. Either of these radar systems (full DAPA or DAPA Lite) may be used in the context of this disclosure. In a general case, bulk scanning methods implemented with substrate-integrated waveguide (SIW) may be combined with a PIN (p-type, intrinsic, n-type) diode, varactor, and/or FET devices. The PIN diodes, varactors, and/or FETs may be positioned across the face of the antenna array to cause modest scanning in a single plane, such as azimuth or elevation.

In some examples, an object may be non-cooperative, which means that the object does not respond to interrogation by a surveillance transponder on the ownship vehicle. The object may be a bird or other animal, a weather balloon, debris, or a vehicle that is not transmitting surveillance signals. Without any surveillance signals from the non-cooperative object, the system may rely on the phased-array radar device to detect and track the distance, direction of travel, and velocity of the object. The phased-array radar device may detect the characteristics or target values of the object by analyzing the returned radar signals that bounce off the object. The common processing circuitry may be configured to analyze both the surveillance signals and the returned radar signals to determine whether an object is non-cooperative. The common processing circuitry may also be configured to compute the target values and deliver the data to any sense and avoid (SAA) algorithm in order to determine whether to cause the ownship vehicle to conduct an avoidance maneuver.

In some examples, an object may be cooperative, which means that the object transmits surveillance signals, either without prompting or in response to interrogation by a surveillance transponder on the ownship vehicle. The common processing circuitry may be configured to determine the distance, direction of travel, and velocity of the object based on the received surveillance signals. The common processing circuitry may be configured to create a list of targets to track. The common processing circuitry may be configured to remove the object from the list based on receiving the surveillance signals from the object. The common processing circuitry may be configured to deliver the data relating to the object to the SAA algorithm.

In some examples, a system of this disclosure may be relatively low weight, relatively low cost, and relatively low power. The system may be mounted on an ownship vehicle such as an unmanned vehicle, including relatively low weight and low cost unmanned aerial vehicles (UAV's) (e.g., Group I and Group II UAV's). In some examples, the common processing and common memory may reduce the cost and weight of the system, as compared to existing systems with separate processors for obstacle detection, surveillance communication, positioning, and/or sensors. In addition, using different transponders and antennas for obstacle detection and surveillance communication may reduce the size of the system, as explained further below.

A radar system of this disclosure may be very small, low cost, and have low power usage, so that the system may be mounted on a small UAV, in some examples. Sharing of the processor and memory for both the surveillance function and the radar tracking may result in more efficient co-processing of cooperative and non-cooperative targets. The system may be small and light because of the elimination of a separate processor for the cooperative surveillance function (e.g., via ADS-B). The common processor may also share a GPS location resource with the radar target tracking and the ADS-B surveillance. The system may include an SAA processor, a DAPA Lite radar, a GPS receiver and/or antenna puck, and an ADS-B module, which may be very small, that is glued to the DAPA chassis and integrated as a single item.

A system with common processing and common memory with separate transponders may include simpler switching elements, as compared to an existing system with a common transponder for radar, surveillance, and/or other functions. The existing system may be configured to switch the common transponder between radar circuitry, surveillance circuitry, and/or circuitry for other functions. The switching elements for a system of this disclosure with separate transponders and common processing may be relatively simple or unnecessary. In contrast, the switching element(s) of an existing system may include several single-pole-double throw switches between the circuit elements and the transponder.

Various examples are described below generally directed to devices, systems, and methods for radar systems. Unmanned Aerial Systems (UAS's) are beginning to penetrate the domestic Federal Aviation Administration (FAA) airspace and are expected to be inter-mixed with other commercial airborne platforms by 2020.

Mission success and mission safety are dependent on the ability to sense the surrounding environment under all operating conditions and fuse the information in a manner that allows a platform's decision system to properly execute the mission objectives. Equipment to make the mission successful can be costly in both price and weight. The systems utilized in GA weigh too much to fit on small UAS's and the majority of unmanned systems are limited in size, weight, and power (SWAP). The requirements for autonomy are more extensive on autonomous vehicles than manned aircraft, and therefore require more extensive sensors to safely operate in the FAA airspace, thereby also requiring lightweight avionics systems. Understanding the current systems and architecture requirements allows each system, based on UAV class, to determine what the minimal functional requirements are. The difficulty is in designing a system with a flexible and scalable architecture to be applicable to varying systems from small UAS's to large UASs.

Understanding these current limitations can help provide a pathway for creating optimal next generation system architectures. Instead of designing multiple individual units to integrate into a federated system, this disclosure describes techniques for a low cost, high quality product.

The techniques of this disclosure may help to create a low cost, low weight collision avoidance system for small UAV/UAS that provides both cooperative and non-cooperative data from other aircraft flying near the UAS in order to avoid midair collision. Cooperative vehicles are vehicles that share their position and direction data with other vehicles. Non-cooperative vehicles are vehicles that do not share position and direction data. This new system may include both a small phased array radar with a wide field of regard/field of view (FOV) and an automatic dependent surveillance-broadcast (ADS-B) transponder that provides both ADS-B IN and OUT, as well as the processing to fuse the information received from both cooperative and non-cooperative sensors.

In some examples, a system of this disclosure may be a low cost, low weight collision avoidance system for small UAV/UAS that provides both cooperative and noncooperative data from other aircraft flying near the UAS in order to avoid mid-air collision. The system may provide both a small phased array radar with a wide field of regard and an ADS-B transponder that provides both ADS-B IN and OUT. The system may have very small SWAP so that it can be flown on small UAV/UAS. An in-house integrated sensor may provide both radar and ADS-B functionality in a very low SWAP package, which may increase the value of both UAV UAS and radars. The integrated system may use a common signal processor/controller for both cooperative and non-cooperative sensor functions. This avoids the need to provide separate processors for each sensor and potentially for collision avoidance algorithms. Using the proposed package significantly reduces power consumption, volume and weight, which may be important for a safety payload on a limited payload small UAS or UAV.

This disclosure provides potential solutions to the problems introduced above and creates and enables a system designed for situational awareness in the surrounding environment, thus helping the vehicle to properly and safely execute mission objectives. An integrated system combines cooperative and non-cooperative sensors to minimize SWAP, while providing the means for Beyond Visual Line of Site (BVLOS) operations. The system includes radar hardware and associated algorithms and processing to identify, from the collected data, trackable intruders in the airspace. The system includes ADS-B transmitter/receiver hardware (i.e., ADS-B IN and OUT) and associated processing to gather surrounding tracks in the area and transmit necessary ADS-B information.

The system may include attitude and heading reference system (AHRS) and Global Navigation Satellite System (GNSS) hardware, such as global positioning system (GPS) hardware, and associated algorithms and processing to gather the ownship data, if the aircraft does not already provide those functions to the sensors. The system includes SAA algorithms, which may include tracking algorithms, which determine length of time to retain a track in the system. The SAA algorithms include data association and track management, which fuses the multiple sensor detections into a single track based on heuristic algorithms. The SAA algorithms include extract state vector statistics, which contain predictive algorithms based on track history and data. The SAA algorithms include data conversion on tracked targets that may be displayed on a customer selected display. The system may include a situational display that provides detailed intruder track information for operator.

There are five major sub-functions that may be included within the Integrated Radar, ADS-B, and SAA (RAS) Architecture: GNSS, that may be integrated with an inertial navigation system or AHRS application, ADS-B application, radar application, SAA application, and display application. These sub-functions may all reside on the same processor, interact and simplify integration and independent mission execution and interaction on multiple platforms to provide situational awareness and BVLOS capability, as displayed in FIG. 13.

For the RAS system, the software may be hosted on a separate controller platform that is capable of sensing the number of panels in the system and combining the digital active phased array (DAPA) radar information into the tracks necessary for the SAA system to track, detect, and provide commands to either the Flight Controls, Flight Director, or Guidance system. Alternately the DAPA Panels may be networked via Ethernet or other bus system and either share the combined processing functions described above or declare one of the DAPA panels to become a Master Panel that provides the combined processing described above with the remaining panels assigned as slave unit(s). Based on the ownship data provided by the AHRS/GNSS system, the SAA algorithm is able to transform the received sensor data to useable position, velocity vectors, heading, etc. The SAA system transforms and fuses the multiple sensor data from both cooperative (e.g., ADS-B transmitters) and non-cooperative (e.g., radar-detected) sources into a single track based on heuristic modeling and algorithms. The track data may then be transformed and provided via a datalink to display the surrounding traffic data that the sensors have provided. The display allows the user to easily declutter and display only what is needed for the specific mission for that vehicle.

FIG. 1 is a conceptual block diagram depicting a system 110 including a phased-array radar device 120, processing circuitry 130, and a surveillance transponder 140, in accordance with some examples of this disclosure. In some examples, system 110 may be mounted on ownship vehicle 100 such as any mobile object or remote object. In some examples, ownship vehicle 100 may be an aircraft such as an airplane a helicopter or a weather balloon, or a space vehicle such as a satellite or spaceship. In yet other examples, ownship vehicle 100 may include a land vehicle such as an automobile or a water vehicle such as a ship or a submarine. Ownship vehicle 100 may also be a manned vehicle or an unmanned vehicle, such as a drone, a remote-control vehicle, or any suitable vehicle without any pilot or crew on board. In some examples, system 110 may be mounted in the nose, the front, the rear, the bottom, and/or the top of the vehicle.

System 110 may include phased-array radar device 120, processing circuitry 130, and surveillance 140. System 110 may also include other components not depicted in FIG. 1, such as a memory device, a positioning device configured to receive positioning signals, and/or one or more sensors configured to detect the location and/or velocity of ownship vehicle 100.

Phased-array radar device 120 may include an array of antennas that are configured to transmit radar signals 160 and receive reflected radar signals 162. Phased-array radar device 120 may be an electronically steered radar device. In some examples, phased-array radar device 120 may transmit radar signals 160 in a range of directions without a mechanically scanning device. In some examples, the electronic steering of phased-array radar device 120 may be faster, lighter, smaller, and/or more energy efficient, as compared to radar devices with antennas that are mechanically steered. For example configurations of phased-array radar devices 120, 220, 320, 426A-426D, and 1220, see radar system 610 of FIGS. 6A and 6B.

Phased-array radar device 120 may be configured to receive reflected radar signals 162. The frequency difference between transmitted radar signals 160 and reflected radar signals 162 may relate to the velocity of object 150 through the Doppler effect. Processing circuitry 130 may be configured to determine the velocity vector of object 150 and/or vehicle 170 based on the frequency difference and/or the previous positions of object 150 and/or vehicle 170. If surveillance transponder 140 receives surveillance signal 182 from vehicle 170, processing circuitry 130 may be configured to determine the velocity vector based on the data encoded in the surveillance signal 182. The velocity vector may include a direction and a magnitude (e.g., a speed).

Processing circuitry 130 may be configured to control phased-array radar device 120 by causing phased-array radar device 120 to transmit radar signals 160. Processing circuitry 130 may include a multiprocessor system on a chip (MPSOC), random access memory (RAM), and/or nonvolatile memory configured to store data relating to object 150 and vehicle 170. System 110 and/or processing circuitry 130 may include a common memory configured to store returns from phased-array radar device 120 and surveillance transponder 140. Phased-array radar device 120 and surveillance transponder 140 may share common RAM that is connected to processing circuitry 130 on a bus system, instead of separate processors, RAM, and memory for other radar systems. Some other radar systems may include a first processor for radar, a second processor for surveillance, and a third processor to combine data from the radar and surveillance functions.

Processing circuitry 130 may be configured to control the direction, time of transmission, and order of transmission of radar signals 160. Processing circuitry 130 may be further configured to analyze reflected radar signals 162, including the intensity, frequency, time of arrival, and angle of arrival of reflected radar signals 162. Processing circuitry 130 may be configured to determine the location and velocity of object 150 based on the characteristics of reflected radar signals 162, including the time of arrival, angle of arrival, amplitude, and/or frequency of reflected radar signals 162.

In some examples, processing circuitry 130 may be configured to determine the direction of travel and velocity of the object based on the difference in frequency between a transmitted signal and a returned signal according to the Doppler effect. By Doppler processing, processing circuitry 130 may differentiate object 150 from mainlobe clutter. In some examples, processing circuitry 130 may be configured to determine the size of the object based on the amplitude and quantity of the returned signals. In some examples, processing circuitry 130 may be configured to determine the angle of object 150 relative to the antenna array of phased-array radar device 120 based on the phase shift in the returned signals received by the antenna array.

Object 150 may be any mobile object or remote object such as an aircraft, a helicopter, or a weather balloon, or object 150 may be a space vehicle such as a satellite or spaceship. In yet other examples, object 150 may include a land vehicle such as an automobile or a water vehicle such as a ship or a submarine. Object 150 may be a manned vehicle or an unmanned vehicle, such as a drone, a remote-control vehicle, or any suitable vehicle without any pilot or crew on board. In some examples, object 150 may be cooperative by, for example, transmitting surveillance signals, such as ADS-B, to inform system 110 of the location and direction of travel of object 150. In other examples, object 150 may be noncooperative, meaning object 150 does not transmit information (e.g., via surveillance signals) such as locating or direction of travel (e.g., position and velocity vector). Object 150 may also be a weather balloon or an animal such as a bird.

Surveillance transponder 140 may include equipment for transmitting surveillance signals 180 and for receiving surveillance signals 182. In some examples, surveillance signals 180 and 182 may include ADS-B signals or any other protocol for communicating position and velocity. In some examples, surveillance transponder 140 may include ADS-B in and out capabilities. Surveillance transponder 140 may include a Mode-S transponder for transmitting and receiving surveillance signals 180 and 182. Surveillance transponder 140 may transmit surveillance signals in digital format including the location of ownship vehicle 100. In some examples, surveillance transponder 140 may also include a receiver configured to receive positioning signals. In some examples, the receiver for positioning signals may be combined or separate from surveillance transponder 140.

In some examples, processing circuitry 130 may be configured to cause surveillance transponder 140 to transmit surveillance signals 180 to vehicle 170. If surveillance transponder 140 does not transmit surveillance signals 182 back to surveillance transponder 140, processing circuitry may be configured to determine that vehicle 170 is noncooperative or a non-vehicle object (e.g., a bird, terrain feature, power line, etc.). Processing circuitry 130 may then be configured to cause phased-array radar device 120 to transmit radar signals 160 to determine the location and velocity of vehicle 170.

In contrast, existing systems may use an L-band transponder to send and receive surveillance signals and to send and receive radar signals. In some examples, the L-band transponder may include an ADS-B transponder and/or a Mode-S transponder. The L-band transponder may be configured to determine the location and velocity of cooperative vehicles by reading the received surveillance signals. The L-band transponder may be configured to determine the location and velocity of uncooperative vehicles by analyzing the surveillance signals transmitted by the L-band transponder that bounce off of the uncooperative vehicles.

One possible disadvantage of using an L-band transponder for detection of uncooperative vehicles is that the wavelength of L-band signals is relatively long (e.g., on the order of one foot), as compared to K-band frequency signals. As a result, the antenna element(s) of the L-band transponder need to be relatively large, as compared to a K-band transceiver. A phased-array radar device configured to receive L-band radar signals is typically very large if the device includes numerous antenna elements. In contrast, a K-band transponder may include antenna elements that are on the order of twenty or twenty-five times smaller than an L-band transponder.

Figure 2:
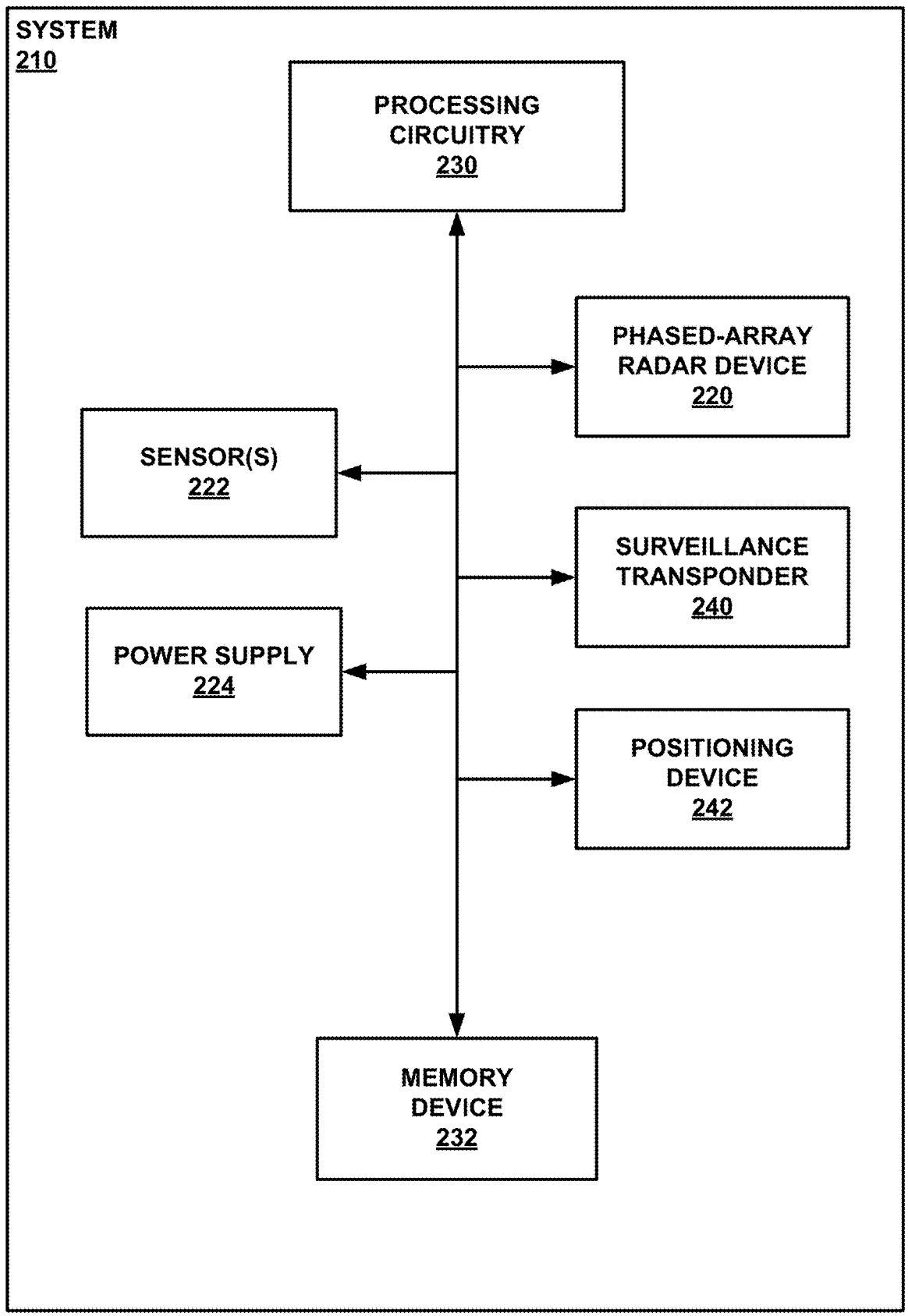
FIG. 2 is a conceptual block diagram depicting a system including a phased-array radar device and a surveillance transponder, in accordance with some examples of this disclosure.

FIG. 2 is a conceptual block diagram depicting a system 210 including a phased-array radar device 220 and a surveillance transponder 240, in accordance with some examples of this disclosure. In some examples, phased-array radar device 220 may include a frequency modulated continuous wave (FMCW) radar device. Sensor(s) 222 may include gyroscopic, solid-state, and/or microelectromechanical systems (MEMS) sensors such as gyroscopes, accelerometers, and magnetometers. Power supply 224 may be configured to deliver electrical power from a rechargeable battery or an electric generator to the components of system 210.

Memory device 232 may be configured to store data relating to objects and vehicles, including past positions and velocities. Memory device 232 may also be configured to store data relating to typical profiles of objects and vehicles. For example, memory device 232 may store data of the reflected radar signals typical of birds, SUAV's, large vehicles, terrain features, and the like. Positioning device 242 may include a Global Navigation Satellite System (GNSS) configured to receive positioning signals from satellites and other transmitters.

Figure 3:
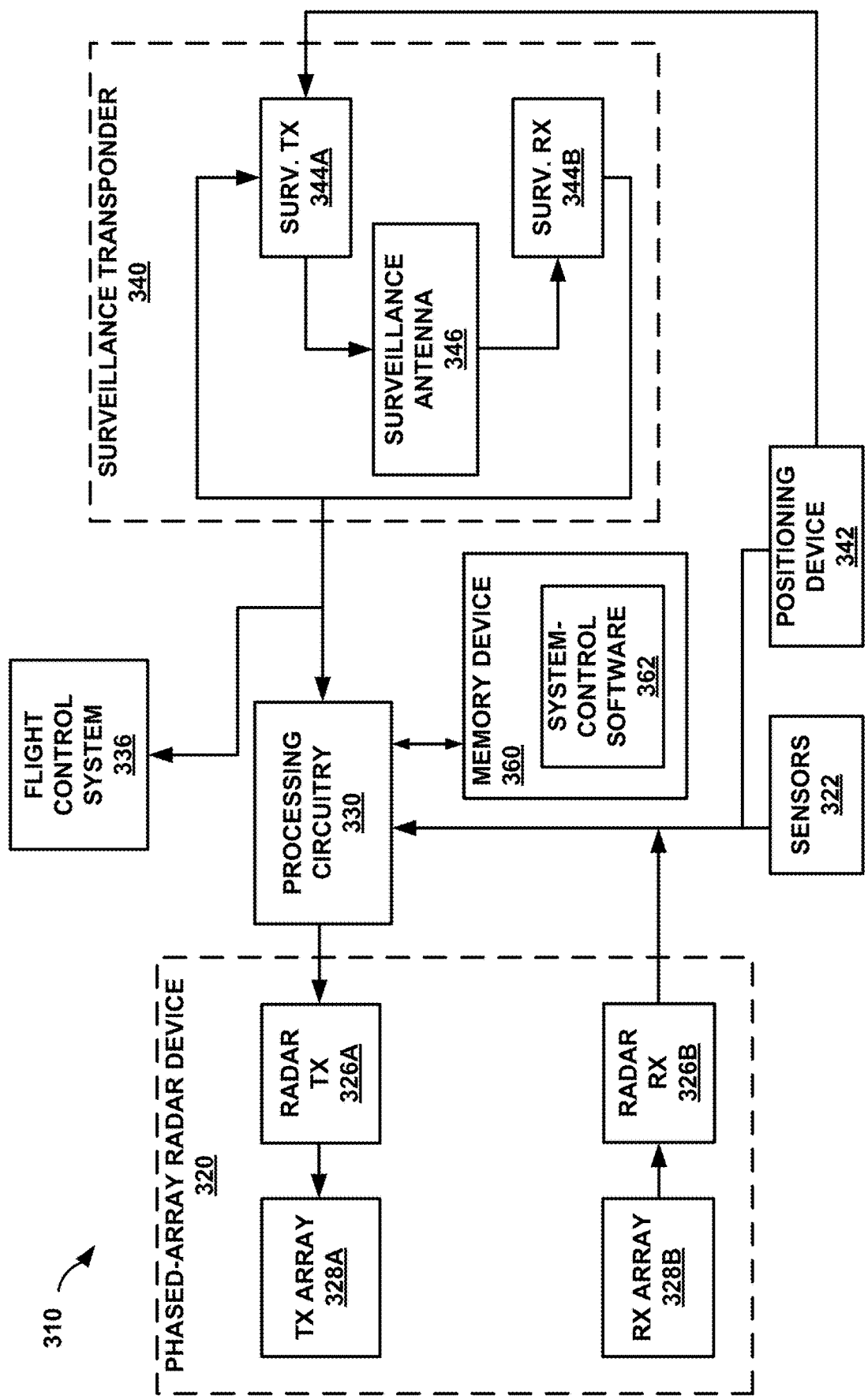
FIG. 3 is a conceptual block diagram depicting a radar system, in accordance with some examples of this disclosure.

FIG. 3 shows several example components of a radar system, in accordance with the techniques of this disclosure. System 310 includes sensors 322, receive circuitry 326B, processing circuitry 330, flight control system 336, positioning device 342, surveillance receive circuitry 344B, and memory device 360.

Sensors 322 may include an AHRS with sensors configured to determine roll, pitch, and yaw. Sensors 322 may include solid-state or MEMS gyroscopes, accelerometers, and magnetometers. Sensors 322 may generate signals that indicate the physical orientation of system 310 and the ownship vehicle. In some examples, sensors 322 may include separate processing circuitry to determine the orientation attitude and heading of the ownship vehicle and may be configured to transmit this data to processing circuitry 330. Processing circuitry 330 may be configured to determine the positions of objects and other vehicles based on the attitude and heading data, as well as the signals received by receive antenna array 328B and surveillance transponder 340.

Phased-array radar device 320 includes transmit circuitry 326A and receive circuitry 326B. In some examples, there may be at least some common circuitry for transmission and receipt. For example, phased-array radar device 320 may include a single master clock, a single synthesizer, and/or a single upconvert circuit. In some examples, phased-array radar device 320 include transmit antenna array 328A and receive antenna array 328B. Antenna arrays 328A and 328B may include separate antennas for transmission and receipt of radar signals. Either or both of antenna arrays 328A and 328B may be configured to scan in azimuth and/or elevation directions. In some examples, transmit antenna array 328A may include fewer antenna elements than receive antenna array 328B.

Processing circuitry 330 may include an MPSoC (multi-processor system-on-chip), such as Zynq® 7020 by Xilinx®, which is one example of a RAS processor, a controller, and/or processing circuitry. Processing circuitry 330 may be configured to receive and process signals from sensors 322, receive circuitry 326B, flight control system 336, positioning device 342, and/or surveillance receive circuitry 344B.

Surveillance transponder 340 includes transmit circuitry 344A, receive circuitry 344B, and surveillance antenna 346. Transmit circuitry 344A may be configured to generate a bit stream indicating the position, velocity, and type of vehicle for system 310. Transmit circuitry 344A may determine the data in the bit stream based on positioning data received from positioning device 342 and other data received from processing circuitry 330. An example ADS-B transponder is the uAvionix Ping1090®.

Flight control system 336 may be configured to control the propulsion and other mechanics of the ownship vehicle. In some examples, the ownship vehicle may be a relatively small and light UAV with propulsors, as compared to a commercial airliner or even a GA airplane. Flight control system 336 may be configured to control the propulsors based on data received from processing circuitry 330. For example, if processing circuitry 330 determines that a potential collision may occur with an object or a vehicle, processing circuitry 330 may be configured to cause flight control system 336 to perform an evasive maneuver and/or a safety maneuver to reduce the likelihood of collision.

Positioning device 342 may include satellite navigation equipment such as a GNSS configured to receive positioning signals from multiple satellites or other transmitters in system 310. One example of a GNSS is a Global Positioning System (GPS). Positioning device 342 may be configured to deliver the positioning signals to processing circuitry 330, which may be configured to determine the location of the ownship vehicle. In some examples, positioning device 342 may include separate processing circuitry to determine the location of the ownship vehicle, and the separate processing circuitry may be configured to communicate the determine location to processing circuitry 330 for use in determining the positions of objects and vehicles.

Memory device 360 is configured to store system-control software 362, which processing circuitry 330 uses to coordinate phased-array radar device 320 and surveillance transponder 340. System-control software 362 may include instructions that cause processing circuitry 330 to analyze reflected radar signals received by phased-array radar device 320 for another vehicle in response to surveillance transponder 340 receiving surveillance signals from the other vehicle. System-control software 362 may include instructions that cause surveillance transponder 340 to interrogate an object detected by processing circuitry 330 based on analyzing reflected radar signals.

Figure 4:
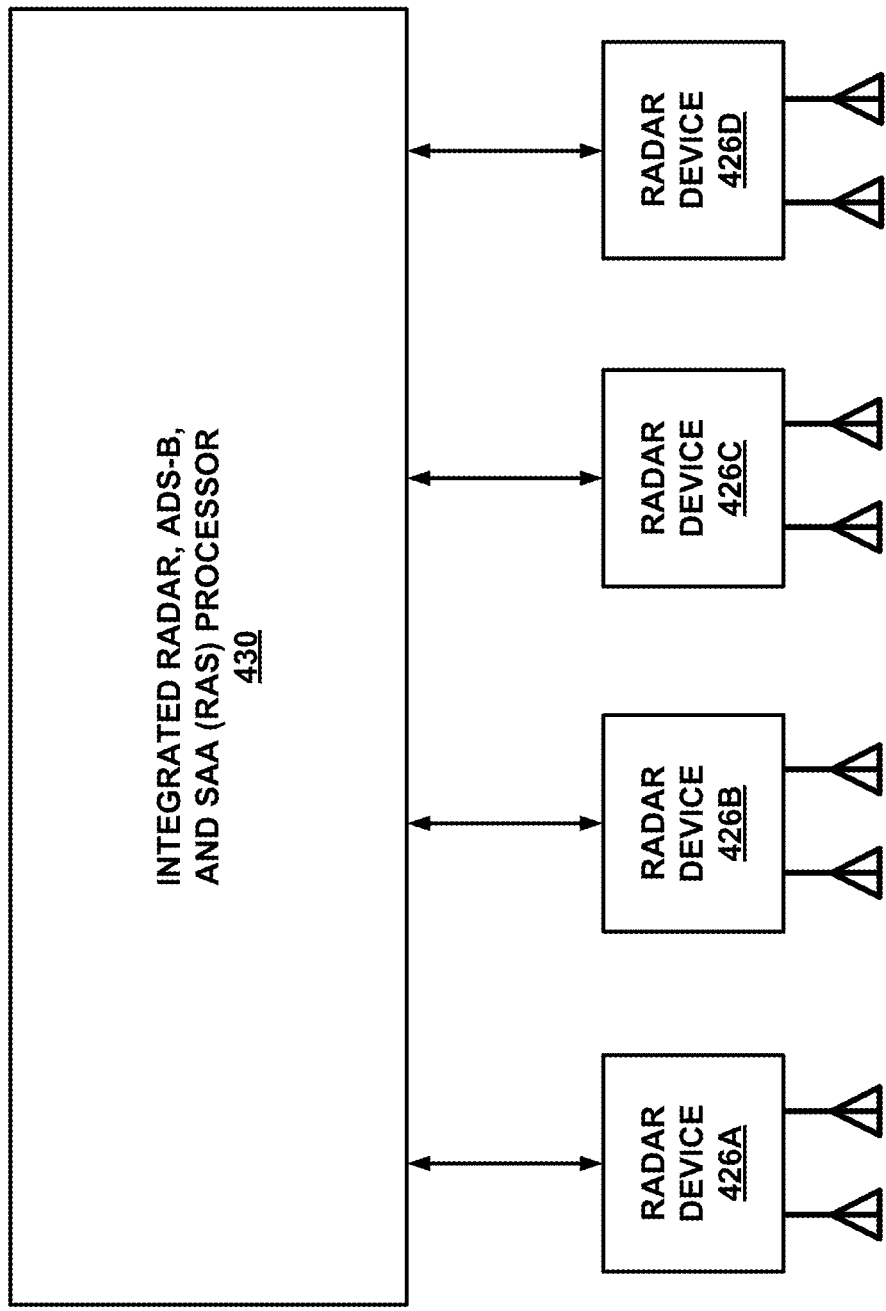
FIG. 4 is a conceptual block diagram depicting a processor connected to four radar devices, in accordance with some examples of this disclosure.

FIG. 4 is a conceptual block diagram depicting a processor 430 connected to four radar devices 426A-426D, in accordance with some examples of this disclosure. Each of radar devices 426A-426D may be a part of a single phased-array radar device. RAS processor 430 is configured to control each of radar devices 426A-426D to scan a volume of space. For example, radar device 426A may be positioned and configured to scan in a first direction, such as in front of the nose of a vehicle, radar device 426B may be positioned and configured to scan in a second direction, such as in front of a first wing of a vehicle, radar device 426C may be positioned and configured to scan in a third direction, such as in front of a second wing of a vehicle, radar device 426D may be positioned and configured to scan in a fourth direction, such as in front of a tail of a vehicle.

Figure 5:
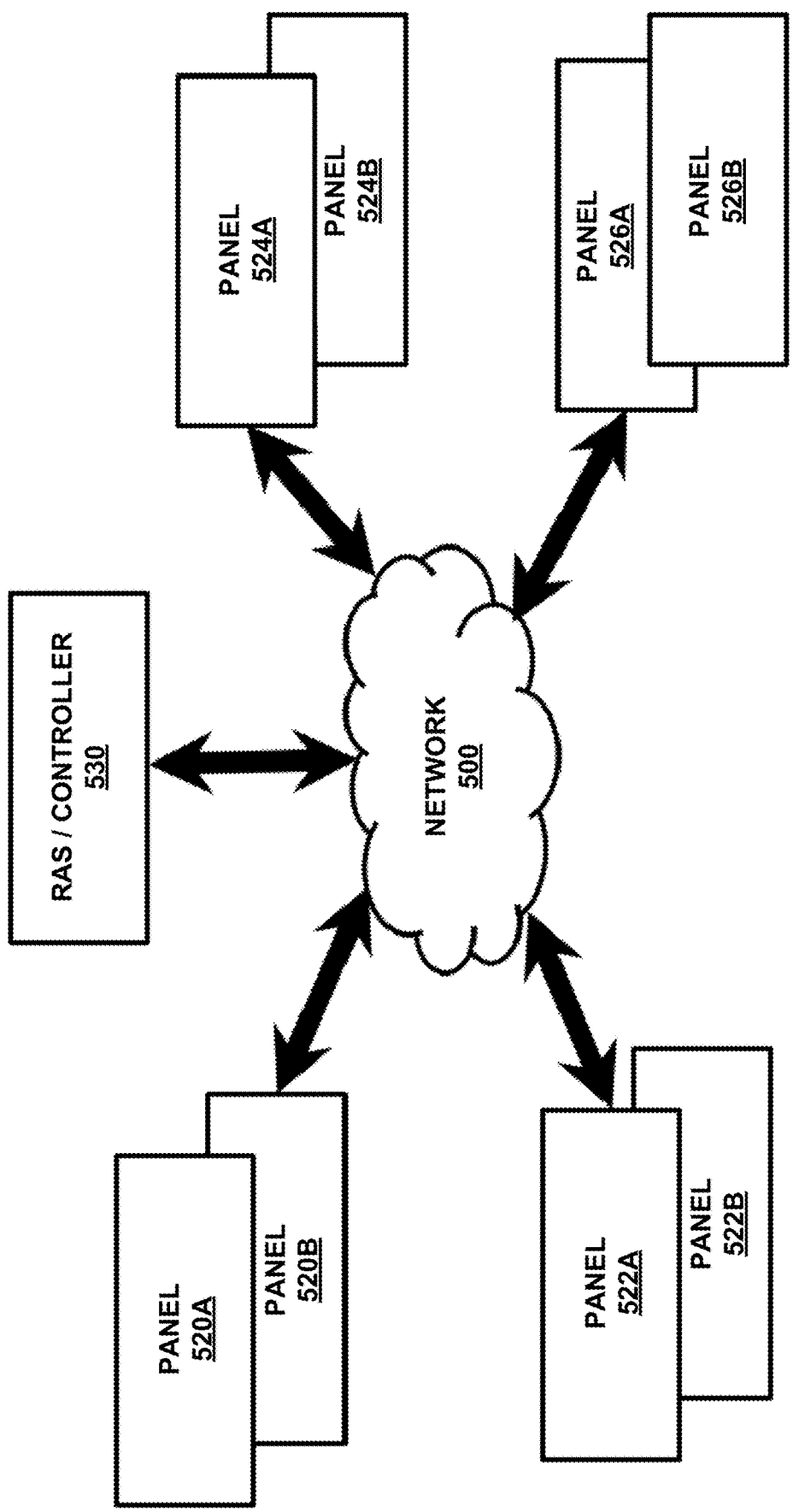
FIG. 5 is a conceptual block diagram a network of multiple radar panels, in accordance with some examples of this disclosure.

FIG. 5 is a conceptual block diagram a network of multiple radar panels, in accordance with some examples of this disclosure. Each location of the phased-array radar device in FIG. 5 includes two panels of panels 520A, 520B, 522A, 522B, 524A, 524B, 526A, and 526B. The panels are connected to controller 530 (i.e., RAS/controller 530) by network 500, which may include wired and/or wireless connections. Network 500 may include optical fiber connections, ethernet connections, metal wire connections, Bluetooth connections, RF connections, and/or any other connections for transferring data between the devices of FIG. 5.

FIG. 5 shows four radar devices 426A-426D, each with a transmitter and receiver, where all four radar devices 426A-426D are connected to the RAS processor (i.e., processing circuitry). The radar devices and/or radar panels may be connected to the RAS processor 430 by a network (see FIG. 5) that includes wireless and/or wired connections such as Ethernet.

The system may include multiple operating frequency bands, such as X band (e.g., 9 gigahertz), Ku band (e.g., 13 gigahertz), K band (e.g., 24 gigahertz), and/or Ka band (e.g., 33 gigahertz). The number of radar panels in the phased-array radar device may be varied to provide the required azimuth coverage. At L band (1 GHz) or S band (3 GHz), the wavelengths of radar signals may be approximately thirty or ten centimeters. Thus, an antenna element with a length of a half of a wavelength may be approximately fifteen or five centimeters (i.e., approximately two or six inches). A phased-array radar device that operates in the L- or S-bands with numerous antenna elements may have relatively large size compared to a small unmanned vehicle.

FIGS. 6A and 6B depict example hardware configurations for phased-array radar device 120. In some examples, phased-array radar device 120 may be configured to operate in FMCW and/or pulsed mode. Additionally or alternatively, phased-array radar device 120 may also include other hardware configurations. Example details of phased-array radar devices may be found in U.S. patent application Ser. No. 14/488,129 filed on Sep. 16, 2014, now U.S. Pat. No. 9,897,695, entitled "Digital Active Array Radar" and U.S. patent application Ser. No. 14/488,154 filed on Sep. 16, 2014, now U.S. Pat. No. 9,972,917, entitled "Digital Active Array Radar," which are incorporated herein by reference in their entirety.

FIG. 6A is a conceptual diagram illustrating an example radar system including an FMCW radar array 612 (e.g., a radar panel). In some examples, the radar system may include any other number of FMCW radar arrays 612, such as at least one FMCW radar array 612 or a plurality of FMCW radar arrays 612. Each FMCW radar array includes a housing 613, a transmit array 618, and a receive array 620. Transmit array 618 includes a respective transmit antenna including a plurality of transmit antenna elements 624. Similarly, receive array 620 includes a respective receive antenna including a plurality of receive antenna elements 634.

For FMCW radar array 612, transmit array 618 and receive array 620 are mechanically attached or coupled to housing 613. In some examples, as shown in FIG. 6A, housing 613 may include two sidewalls, two end walls, and a back wall. Housing 613 generally defines a rectangular box, with one side (the front side) being substantially open. The front side of housing 613 may be substantially open, exposing the transmit antenna elements and receive antenna elements.

FMCW radar array 612 may be mechanically coupled to a radar system frame, which may be mechanically coupled to a frame of a vehicle on which the radar system is used. In other examples, FMCW radar array 612 may be mechanically coupled directly to frame of the vehicle on which the radar system is used.

A transmit array/receive array pair may be configured to scan a predetermined window with a predetermined extent in azimuth and elevation. In some examples, the predetermined extent in azimuth may be about ±40° from the plane orthogonal to the face of the transmit array/receive array pair or about ±38° in azimuth. For example, three transmit array/receive array pairs may be disposed at angles with respect to each other and the predetermined window for each transmit array/receive array pair may overlap with the predetermined window for the adjacent transmit array/receive array pair(s), radar system may allow a total azimuth scan area of between about 220° and about 228° in some examples. The total azimuth scan area may depend at least in part on an overlap in azimuth between scan areas of three FMCW radar arrays 612.

FMCW radar array 612 also includes an electronic band gap (EBG) isolator 622. EBG isolator 622 is disposed between transmit array 618 and receive array 620. EBG isolator 622 may be formed of an electrically conductive material or formed of an electrically insulating material coated with an electrically conductive material. EBG isolator 622 may be build using standard printed circuit methods and may use less volume and be less expensive to implement, as compared to a slotted choke. EBG isolator 622 may be placed to attenuate strength of electromagnetic radiation output by a respective one of the transmit antennas at the adjacent one of the receive antennas. EBG isolator 622 may be configured to prevent propagation across the surface between the transmit antennas and the receive antennas. EBG isolator 622 may include tiny squares that are shorted to ground with a small printed via.

Transmit arrays 618 includes a transmit antenna including a plurality of transmit antenna elements. FMCW radar array 612 includes a transmit array 618 and a receive array 620. Transmit array 618 includes a transmit antenna including a plurality of transmit antenna elements 624. In some examples, the plurality of transmit antenna elements 624 may be disposed in a plurality of rows, where the number of transmit antenna elements 624 in each respective row is the same. In some examples, the number of transmit antenna elements 624 in a single row is greater than the number of rows in the transmit antenna. In this way, in some examples, the transmit antenna may be wider than it is tall, and the transmit beam formed by the transmit antenna may be larger in elevation than in azimuth, such as forming an elliptical shape that is taller than it is wide. In some examples, this may allow the transmit beam to cover substantially the entire elevation of the predetermined window in a single scan.

Both the full version and the lite version of DAPA may include high-aspect-ratio transmit antennas and essentially square receive antennas. The full version of DAPA may include two rows of patch elements that are joined into simple two-element columns. DAPA Lite may include just one SIW waveguide stick to provide transmit illumination. DAPA Lite may be configured to have a wide azimuth beam, and DAPA may be configured to have a wide elevation beam. Thus, the full version and the lite version of DAPA are designed to be rotated ninety degrees from each other.

In other examples, the number of transmit antenna elements 624 in a single row is less than the number of rows in the transmit antenna. In this way, in some examples, the transmit antenna may be taller than it is wide, and the transmit beam formed by the transmit antenna may be larger in azimuth than in elevation, such as forming an elliptical shape that is wider than it is tall. In some examples, this may allow the transmit beam to cover substantially the entire azimuth of the predetermined window in a single scan.

In general, the number of transmit antenna elements 624 in a first transmit array dimension (e.g., width or height) may be greater than the number transmit antenna elements 624 in a second transmit array dimension (e.g., height or width). The first transmit array dimension may be substantially perpendicular to the second transmit array dimension. A transmit antenna that includes a greater number of transmit antenna elements in the first transmit array dimension than in the second transmit array dimension may produce a transmit beam that is elongated in a first illumination dimension compared to a second, substantially perpendicular illumination dimension. Although the remainder of this description describes examples in which the transmit antenna includes more transmit antenna elements 624 in a single row that the number of rows of transmit antenna elements 624, a person having ordinary skill in the art will understand that the first and second transmit array dimensions may be any substantially perpendicular dimensions, and that the first and second illumination dimensions are based on the first and second transmit array dimensions.

In the example illustrated in FIG. 6A, the transmit antenna includes one row of transmit antenna elements 624, and the row includes twenty-four transmit antenna elements 624. However, in other examples, the transmit antenna may include more than one row of transmit antenna elements 624, and each row of the transmit antenna may include more or fewer than twenty-four transmit antenna elements 624. In general, the transmit antenna may include at least one row of transmit antenna elements 624, and each row may include a plurality of transmit antenna elements 624. Alternatively, or additionally, transmit antenna elements 624 may not be arranged in a row as depicted in FIG. 6A; instead, transmit antenna elements 624 may be arranged in another geometric or non-geometric array. In some examples, transmit antenna elements 624 may include aperture coupled microstrip patches.

FMCW array 612 also includes a receive array 620 including a plurality of printed circuit boards (PCBs) 626A and 626B (see FIG. 6B) on which or in which at least some of the electronics and receive antenna elements of receive array 620 are disposed. Each of PCBs 626A and 626B is connected to a master interconnect board 628 by a respective one of connectors 630. Master interconnect board 628 may be mechanically attached or coupled to housing 613, e.g., to a back wall of housing 613.

Each of PCBs 626A and 626B includes a plurality of receive antenna elements. In some examples, the receive antenna elements may be radiating dipoles. In some examples, the receive antenna elements may be aperture coupled microstrip patches. In other examples, receive array 620 may include another physical configuration more or fewer PCBs 626A and 626B, or a construction similar to transmit array 618, in which a plurality of receive antenna elements are mounted on or formed in a major surface of a printed board or other substrate.

FIG. 6B depicts a side view of FMCW radar array 612 including housing 613, PCBs 626A and 626B, structural core 670, MTh circular connector 672, stand-off 674, cavity 676, and board-to-board connectors 678. FIG. 6B depicts one example construction of DAPA Lite. PCBs 626A and 626B, which are inside housing 613, may include electrical connections for structural core 670, the transmit antenna array and the receive antenna array(s), and board-to-board connectors 678. PCBs 626A and 626B may include small metal shields that cover active circuitry to prevent internal coupling and noise. PCB 626A may include the antenna and radio-frequency circuitry, and PCB 626B may include the core digital and power supply circuitry.

MIL circular connector 672 may include a mechanical element that is configured to mount on a vehicle frame. Stand-off 674 may be configured to protect structural core 670 from damage. Cavity 676 may be positioned in the center of the chassis of FMCW radar array 612. Cavity 676 may extend five or six millimeters in the z-axis direction. Heat sink 682 may include ribs machined into the chassis of FMCW radar array 612. In some examples, FMCW radar array 612 may have dimensions of only four inches in the x-axis direction by eight inches in the y-axis direction by one inch in the z-axis direction.

Radar array 612 may be configured to use a fixed wide-beam illumination in azimuth and electronically scan that fixed illumination vertically using bulk methods of varactors and PIN diodes distributed across the back of transmit antenna elements 624 and receive antenna elements 620 and not as typical individual phase shifters. The system may be configured to form one monopulse receive beam at a time, where the monopulse receive beam is electronically scanned with demodulation circuitry. The processing circuitry may be configured to perform vertical beam steering using distributed varactors and PIN diodes.

The system may have substantial common electronics, software, and firmware. The microwave receiver may be common to X, Ku, K, and Ka bands. The digital beam steering may be common on all frequency bands. The beamforming logic may be common across bands and number of panels. The transmit waveform synthesis method and receiver processing may be common across bands and number of panels. The distributed architecture may include networking interface via Ethernet.

A system of this disclosure may integrate AHRS and GNSS capability for ownship data, and integrate an ADS-B in and out chip and capability into the DAPA Radar for cooperative sensing. A system of this disclosure may also integrate Low Cost SAA and DAPA firmware as backend for fusion, tracking, and data for traffic display. The system may also create a mobile application capable of displaying tracks on a phone, tablet, and/or other display. The system may create demonstration flight test plans and conduct demonstration flights. The system may also apply for a part 107 BVLOS waiver.

In accordance with the techniques of this disclosure, a single integrated electronics package that contains full sense and avoid collision avoidance capability for both cooperative and non-cooperative aircraft, such that both an active phased array radar (DAPA Lite) for non-cooperative aircraft and a full function ADS-B transponder with both IN and OUT capabilities to interrogate other cooperative aircraft may be integrated into a single package. The ADS-B and the Radar share a common signal processing element between the two systems such that data for both cooperative and non-cooperative targets may be tracked on the same processor and in a shared memory resource. This direct integration may greatly simplify the communications between the two functions such that separate functional processors with a connecting bus between them is not required. This configuration may lead to a reduction in hardware cost, power consumption and latency between the two functions.

The hardware for the system may be applicable to multiple platforms from small UAS to large UAS (heavyweight). The hardware may include distributed architecture for best placement for full 360 FOV and Center of Gravity. The hardware may include co-located architecture for combined system for simple integration. The hardware may also include single to multiple panels with a specified controller that hosts the RAS processing.

The system may include airspace awareness such as turning non-cooperative information received to ADS-B airspace awareness so others in the area are aware of the non-cooperative intruder. The system may include the following abilities: communications link in voice and ADS-B, tower, self, and other/intruders.

The system may include a cooperative self-separation ability via ADS-B link and a non-cooperative self-separation via radio link. There are multiple possible configurations of the phased-array radar device, including 90 to 360 degree FOV packaged into an existing DAPA physical package with protective radomes for both the DAPA apertures and the ADS-B IN and OUT antenna aperture. The 90-360 views may be blended into track information for SAA algorithm.

The system may include integrated and fused cooperative and non-cooperative track information via SAA. The automated operations of the system may include an integrated system configured to avoid potential maneuvers that could cause the ownship to enter into a potential collision. ADS-B information may allow the system to use more than just radar information in the self-separation (SS) or collision avoidance (CA) maneuver. The system may include flight management commands (RA/TA or velocity escape vector) and optional flight control performance information to be included via a graphical user interface (GUI) or display.

The system may include situation awareness for the operator via a display that allows the operator to track information such as the international civil aviation organization (ICAO) address, mode-S transponder identification (ID), position, heading, velocity, and so on. The display may present velocity vectors to the operator. The display may allow the operator to declutter the display by choosing the options to present. The display may include SAA information, range, rate, and velocity relative to traffic showing SS color and CA color similar to a traffic collision avoidance system (TCAS) display.

In some examples, radar panels may be mounted on a vehicle at locations based on the field of regard of the radar panels. Locations on a vehicle that protrude from the vehicle may offer the greatest visibility for the radar panels, as well as the greatest risk of collision. For example, radar panels may be positioned on the wings of an aircraft to identify objects that may collide with the wings.

Figure 7:
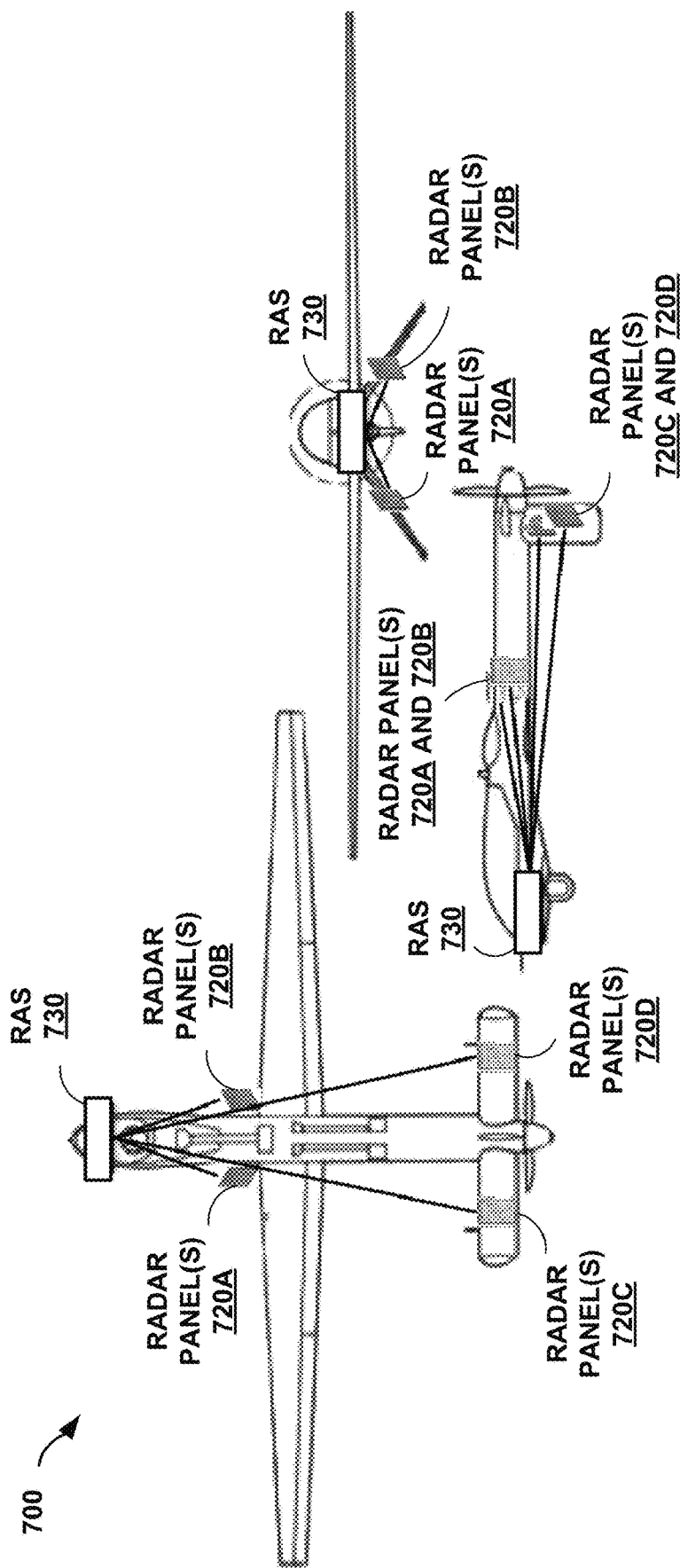
FIG. 7 illustrates three views of a vehicle with a processor and radar panels, in accordance with some examples of this disclosure.

FIG. 7 illustrates three views of vehicle 700 with a processor and radar panels, in accordance with some examples of this disclosure. FIG. 7 depicts vehicle 700 as aircraft (e.g., a UAV), but radar panels may also be mounted on land vehicles, marine vehicles, space vehicles, and/or immobile objects. Vehicle 700 may include radar panels 720A and 720B mounted on the insides of the right front wing and left front wing. Radar panels 720C and 720D may be mounted on the rear wings of vehicle 700, and RAS controller 730 may be positioned at the nose of vehicle 700.

Figure 8:
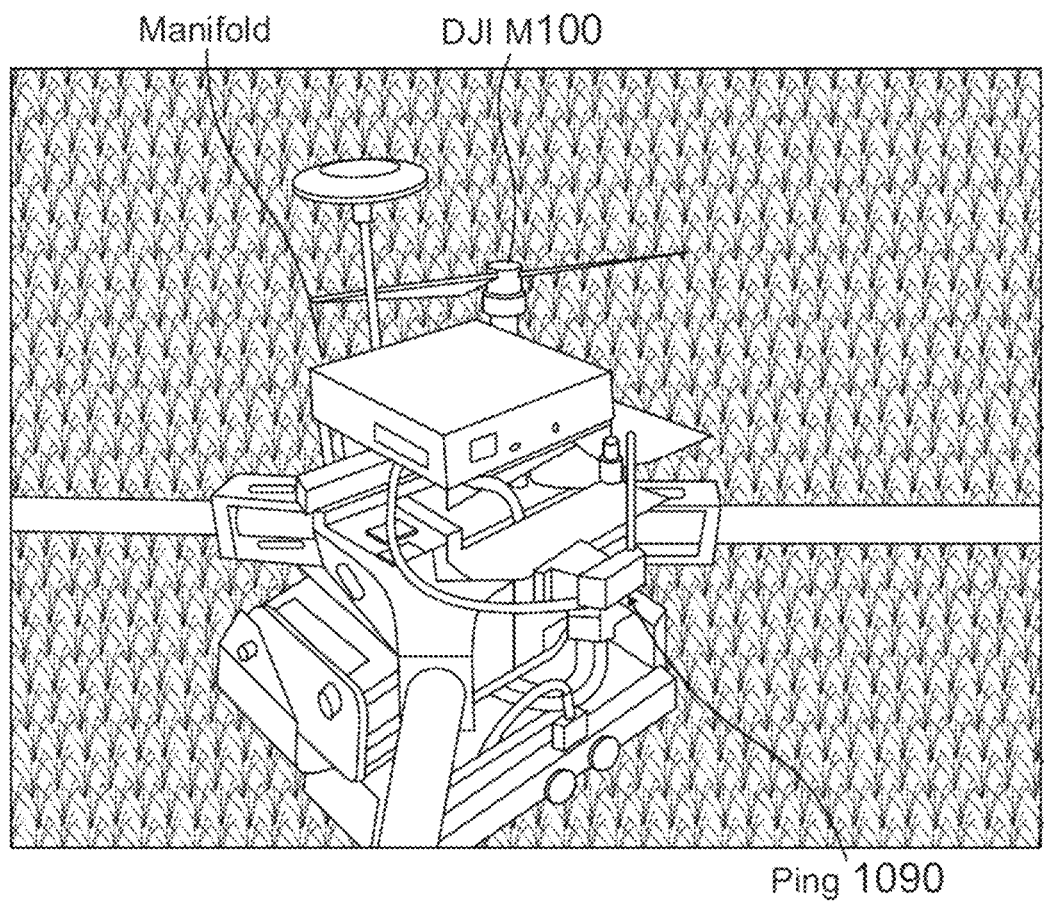
FIG. 8 shows a vehicle including a phased-array radar device mounted on the vehicle, in accordance with some examples of this disclosure.

FIG. 8 shows a vehicle including a phased-array radar device mounted on the vehicle, in accordance with some examples of this disclosure. FIG. 8 shows the phased-array radar device mounted on a Matrice100™ (M100) UAV sold by Da-Jiang Innovations Science and Technology Co., Ltd (DJI). FIG. 8 shows the manifold of the UAV and a Ping1090® ADS-B transponder.

Figure 9:
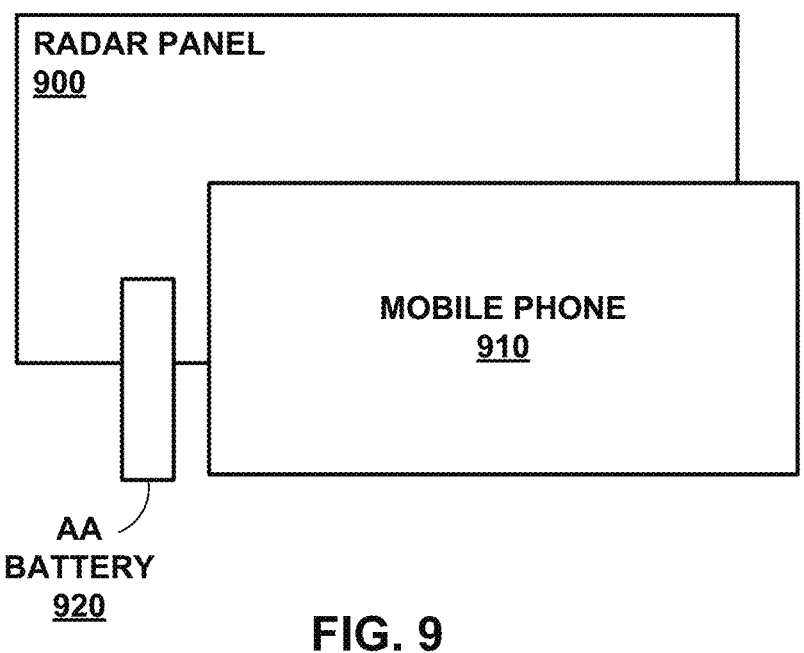
FIG. 9 shows a radar panel, a mobile phone, and a battery for size reference, in accordance with some examples of this disclosure.

FIG. 9 shows a radar panel 900, a mobile phone 910, and a battery 920 for size reference, in accordance with some examples of this disclosure. Radar panel 900 may include dimension on the order of four inches by eight inches and include both transmit antennas and receive antennas. A phased-array radar device configured to transmit and receive K-band radar signals may include half-wavelength antenna elements that are approximately four or five millimeters in length. Thus, an array of thirty by twenty antenna elements may have a length of fifteen centimeters (approximately six inches) and a width of ten centimeters (approximately four inches).

A system of this disclosure may scan for objects using digital beam steering of a phased array of antenna elements. FIGS. 6A, 6B, and 9 show radar panels, where each radar panel may include a transmitter array of antenna elements and a receiver array of antenna elements. Radar panel 900 may include one or more transmit antenna elements and one or more receive antenna elements. In some examples, it may be desirable for radar panel 900 to include more receive antenna elements than transmit antenna elements because the processing circuitry may perform digital beamforming on returned radar signals.

Figure 10:
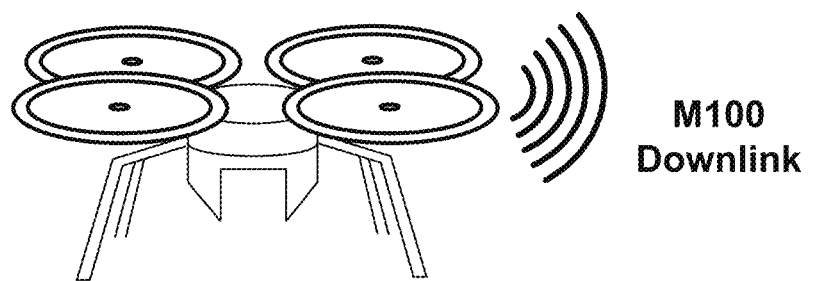
FIG. 10 shows a vehicle, in accordance with some examples of this disclosure.

FIG. 7 shows the possible arrangements of radar panels on three example vehicles. The processing circuitry may be configured to determine the locations and directions of each radar panel. The processing circuitry may be configured to piece together the data from each radar panel to create map or display of objects and vehicles, including the ownship vehicle. FIG. 10 shows a vehicle, in accordance with some examples of this disclosure, where the vehicle may communicate information received by the phased-array radar device and/or the surveillance transponder to a base station or a ground controller. FIGS. 8 and 10 show example vehicles with radar systems mounted on the vehicles.

Figure 11:
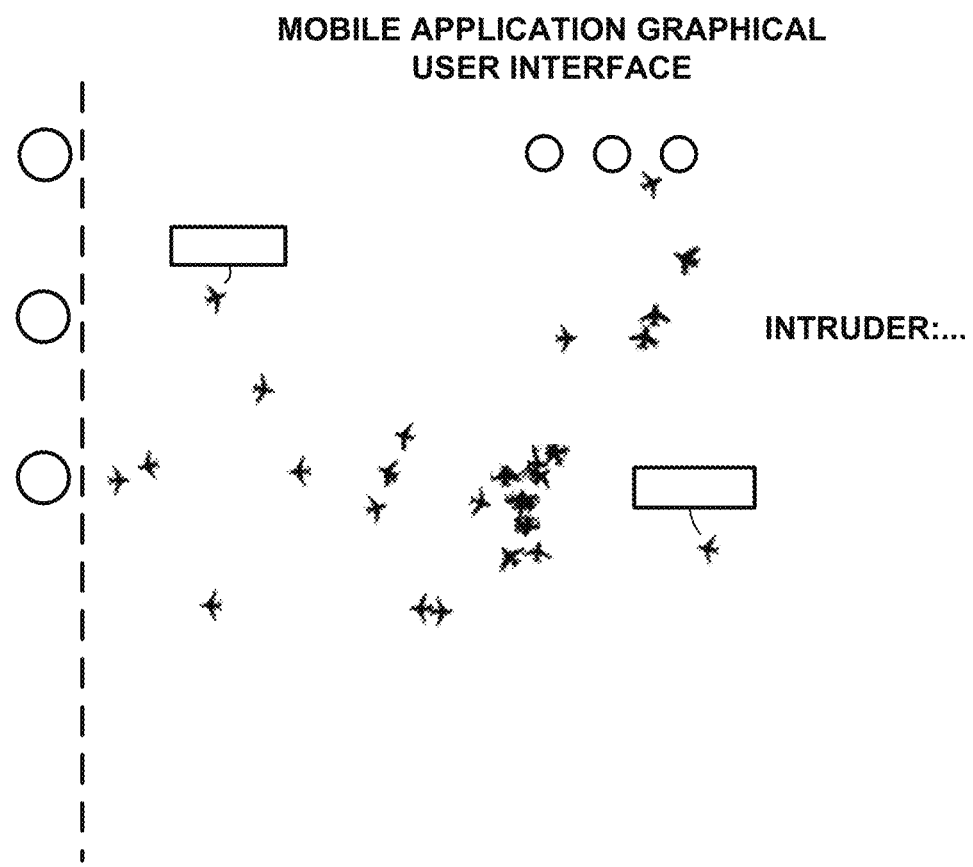
FIG. 11 shows a display of a position of multiple vehicles on a map, in accordance with some examples of this disclosure.

FIG. 11 shows a display of a position of multiple vehicles on a map, in accordance with some examples of this disclosure. A computer, smartphone, tablet, or another device may generate the display based on data received from a system of this disclosure. The phased-array radar device and the surveillance transponder may receive signals indicating the positions of the multiple vehicles shown in FIG. 11. The system may be configured to process and transmit the data to a base station or a ground controller for display to a user.

Figure 12:
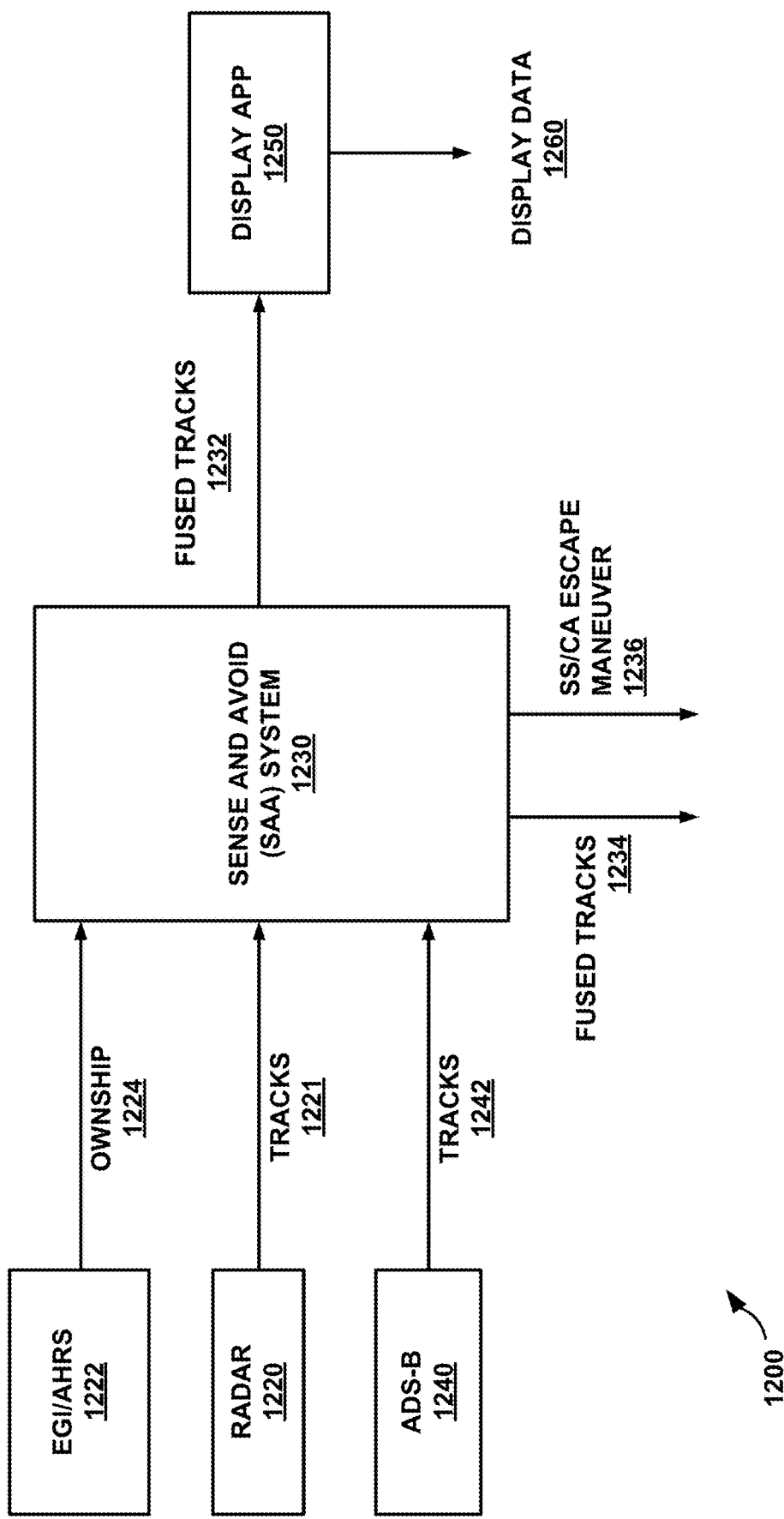
FIG. 12 is a conceptual block diagram depicting a system, in accordance with some examples of this disclosure.

FIG. 12 is a conceptual block diagram depicting a system 1200, in accordance with some examples of this disclosure. Embedded GPS and inertial navigation system (INS) (together, EGI) and AHRS 1222 may be configured to determine the position, velocity, heading, course, bearing, pitch, yaw, and roll of the ownship vehicle and transmit the ownship data 1224 to SAA system 1230. EGI/AHRS 1222 may be configured to receive and process raw GPS signals with a navigation model. EGI/AHRS 1222 may be configured to receive and process raw AHRS signals data reader and to decode the EGI and AHRS data before transmitting ownship data 1224 to SAA system 1230.

Radar device 1220 may include common transmit waveforms, digital beam steering, and phased array transmit processing on the transmission side. Radar 1220 may also include phased array receive processing and tracking algorithms for raw pulses on the receive side. Processing circuitry may be configured to pre-process and decode the received data. ADS-B device 1240 may be configured to encode and format data received from EGI/AHRS 1222 and SAA 1230 into serial ADS-B bit streams for transmission. On the receive side, ADS-B device 1240 may be configured to read and decode data received by the surveillance transponder. Radar device 1220 and ADS-B device 1240 may be configured to transmit tracks of other objects and other vehicles to SAA system 1230.

SAA system 1230 may include instructions in a format such as Mathworks® Auto-Code for transforming ownship data 1224 and tracks 1221 and 1242 to Cartesian coordinates. SAA system 1230 may be configured to associate the received data and manage the tracks of objects and vehicles. SAA system 1230 may be further configured to extract state vector statistics and convert the data to sigma vectors, statistics, and DTIF tracks. SAA system 1230 may be configured to output fused tracks 1232 and 1234. In some examples, SAA system 1230 is configured to determine a self-separation (SS) maneuver or CA maneuver 1236. SAA system 1230 may be configured to communicate maneuver 1236 to a flight control system that controls the engines and/or propellers. Display application 1250, which may run on a computer or smartphone, may be configured to output display data 1260 to a user. Fused tracks 1232 may be encoded or decoded using a protocol such as Aeronautical Radio, Inc. (ARINC) 735B.

Figure 13:
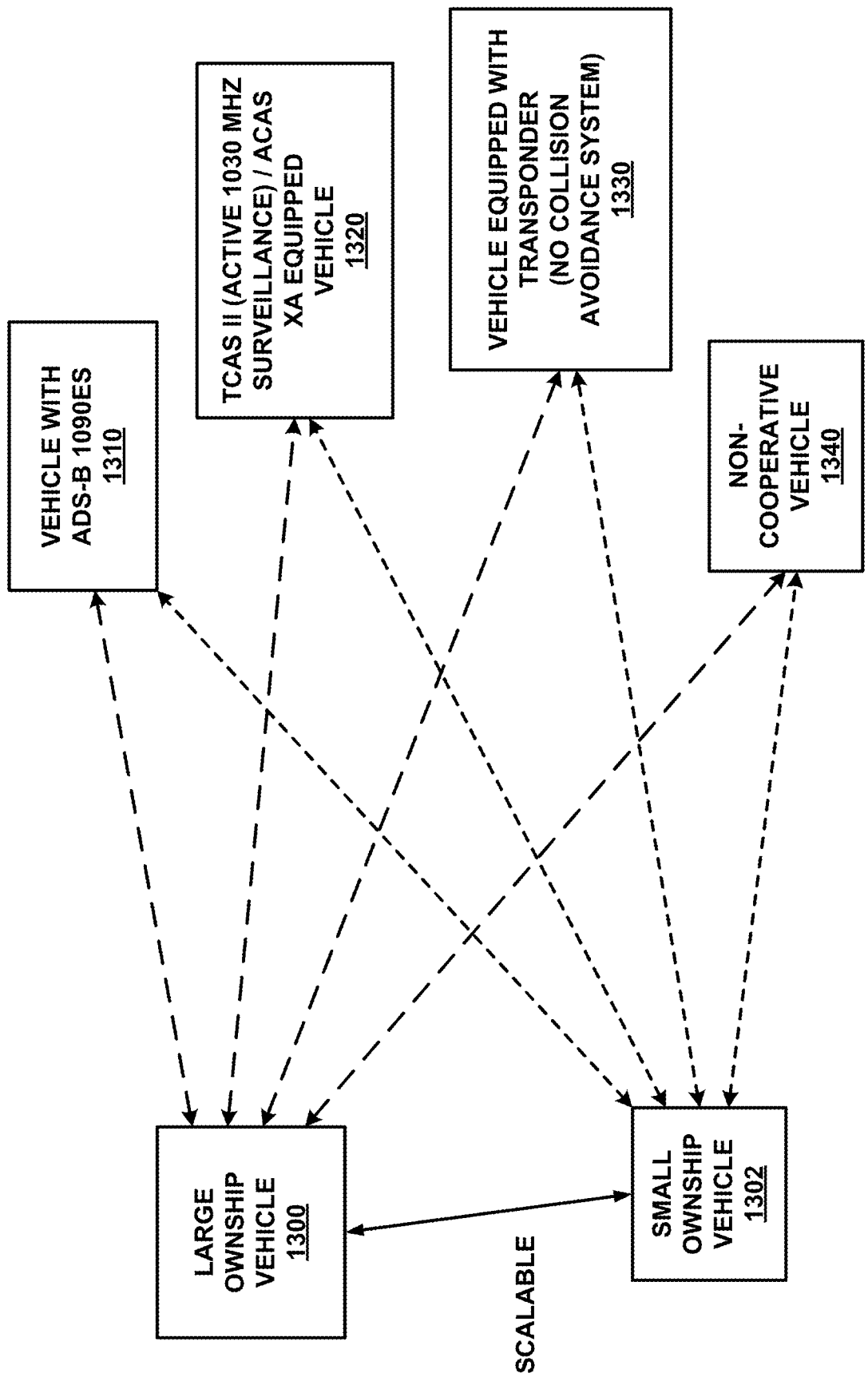
FIG. 13 is a conceptual block diagram depicting several vehicles, in accordance with some examples of this disclosure.

FIG. 13 is a conceptual block diagram depicting several vehicles in an area around the ownship vehicle 1300 or 1302. A system of this disclosure may be scalable from large ownship vehicle 1300 to small ownship vehicle 1302 because the system may have high functionality and relatively low cost and relatively low weight, as compared to radar systems for commercial aircraft. The system may communicate and detect various types of other vehicles and other objects, such as vehicle 1310 with ADS-B 1090ES (extended squitter), vehicle 1320 with TCAS II (active 1,030 megahertz surveillance)/airborne collision avoidance system (ACAS), and vehicle 1330 equipped with transponder without a collision avoidance system, each of which may transmit surveillance signals to ownship vehicle 1300 or 1302. The system may also be configured to detect and track non-cooperative vehicle 1340 based on returned radar signals transmitted by a phased-array radar device.

Figure 14:
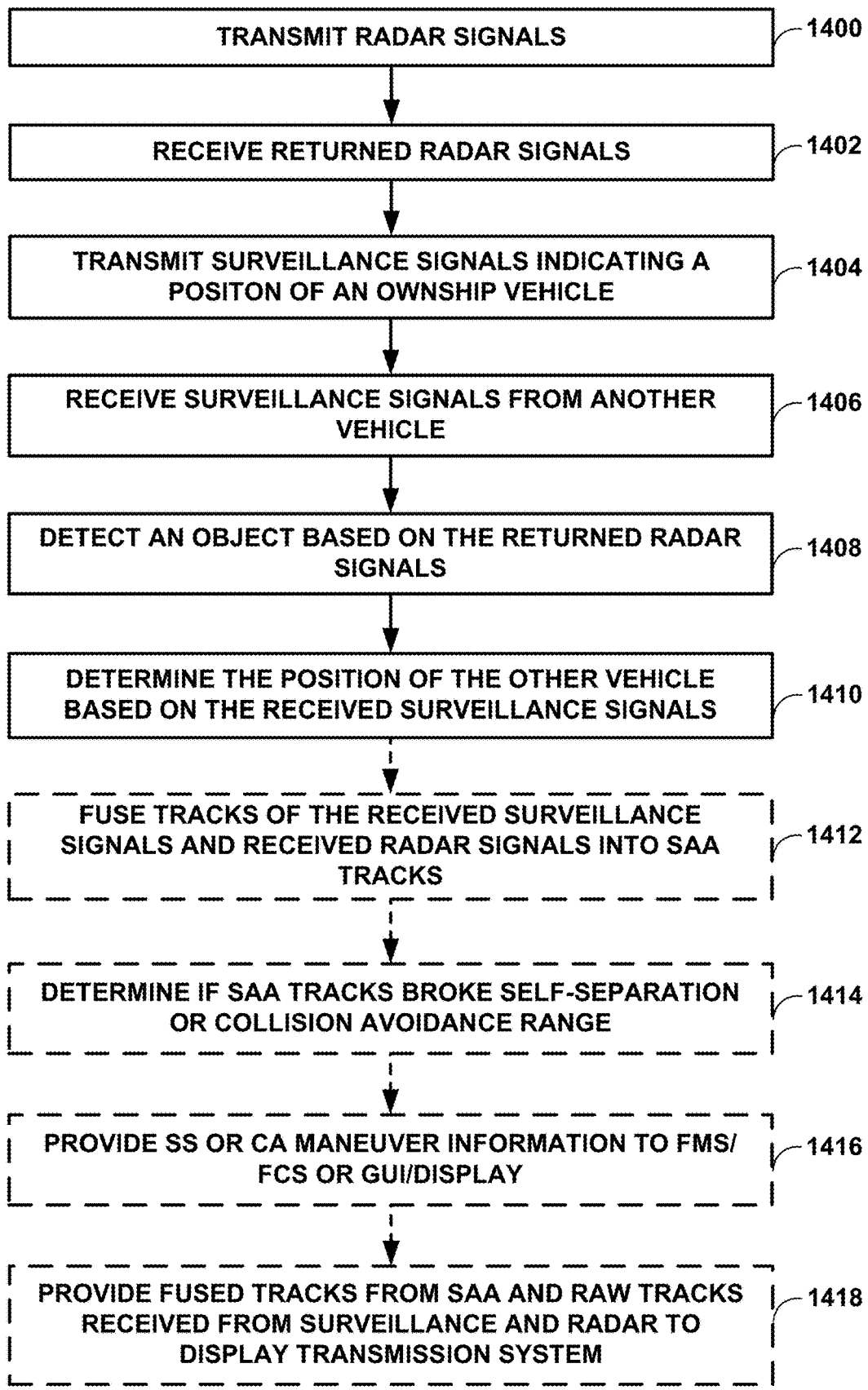
FIG. 14 shows a flowchart for example techniques for operating a phased-array radar device and surveillance transponder, in accordance with some examples of this disclosure.

FIG. 14 shows a flowchart for example techniques for operating a phased-array radar device and surveillance transponder, in accordance with some examples of this disclosure. The example techniques of FIG. 14 are described with respect to system 110 of FIG. 1, although other components such as systems 210 and 310, may perform similar techniques.

In the example of FIG. 14, phased-array radar device 120 transmits radar signals 160 (1400) and receives returned radar signals (1402). Radar signals 160 and 162 may include K-band signals with relatively short wavelengths so that the antenna elements of phased-array radar device 120 can be relatively small, as compared to L-band radar. System 110 may use phased-array radar device 120 to detect objects including non-cooperative vehicles that are not transmitting surveillance signals and vehicles that may transmitting false surveillance signals.

In the example of FIG. 14, surveillance transponder 140 transmits surveillance signals 180 indicating a position of ownship vehicle 100 (1404). Surveillance signals 180 may include L-band signals such as ADS-B signals. Surveillance signals 180 may indicate the position and velocity of ownship vehicle 100. In the example of FIG. 14, surveillance transponder 140 also receives surveillance signals 182 from vehicle 170 (1406). Surveillance signals 182 may indicate the position and velocity of vehicle 170, including latitude, longitude, and altitude. Vehicle 170 may be a cooperative vehicle equipped with a surveillance transponder or a non-cooperative vehicle as shown in FIG. 13 (i.e., non-cooperative vehicle 1340).

In the example of FIG. 14, processing circuitry 130 detects object 150 based on returned radar signals 162 (1408). Processing circuitry 130 may be configured to employ tracking algorithms to determine the current position of object 150 and determine a predicted future position of object 150. In the example of FIG. 14, processing circuitry 130 also determines the position and velocity vector of vehicle 170 based on received surveillance signals 182 (1410). Processing circuitry 130 may be configured to read and decode the data in surveillance signals 182.

In the example of FIG. 14, processing circuitry 130 may fuse tracks of radar signals 162 and tracks of surveillance signals 182 into SAA tracks (1412). Processing circuitry 130 may be configured to determine tracks for an object in order to predict the movement of the object. Processing circuitry 130 may be configured to fuse data from signals 162 and 182 to create SAA tracks for object 150 and vehicle 170. Processing circuitry 130 may be configured to fuse the data by averaging the position of an object as determined from returned radar signals 162 and the position of an object as determined from surveillance signals 182 to determine a fused position. Processing circuitry 130 may also determine if an SAA track broke an SS or CA range (1414). Processing circuitry 130 may be configured to determine a protection envelope around ownship vehicle 100 that includes a range. If processing circuitry 130 determines that the track of an object will break the protection envelope, processing circuitry 130 may determine an avoidance maneuver.

Processing circuitry 130 may be configured to provide an SS maneuver or CA maneuver to a flight management system (FMS), a flight control system (FCS), a graphical user interface (GUI), or a display (1416). Processing circuitry 130 may be configured to process an SS escape maneuver or a CA escape maneuver based on object 150 or vehicle 170 crossing a specified boundary. Processing circuitry 130 may then be configured to issue or deliver the escape maneuver to the FMS, FCS, GUI, and/or display. Processing circuitry 130 may cause the FMS or FCS to conduct the protective maneuver for ownship vehicle 100 by generating thrust, applying brakes, or some other action. The GUI or display may present the protective maneuver to a vehicle operator. Processing circuitry 130 may also provide fused tracks from an SAA system and raw tracks determined from radar signals 162 and from surveillance signals 182 to a display transmission system (1418). Processing circuitry 130 may be configured to process display signals including raw cooperative signals, raw non-cooperative signals, and fused tracks. The display system may present the raw signals and the tracks to the vehicle operator.

In some examples, system 110 may also include a control system such as an FCS or an FMS. The control system may include a display device for presenting information to a user, where the information may include the positions of ownship vehicle 100, object 150, and/or ownship vehicle 170. Processing circuitry 130 may be configured to generate fused tracks based on received signals 162 and 182. The fused tracks may represent the current and past determined positions of object 150 and/or vehicle 170. Processing circuitry 130 may then be configured to transmit display signals of the unfused signals (e.g., signals 162 and/or 182) and fused signals (i.e., the fused tracks) to the control system to cause the control system to take an evasive maneuver. Alternatively or additionally, processing circuitry 130 may be configured to cause the control system to present the raw data and/or the fused data to a user via a display device.

The FMCW phased-array radar device may be configured to detect various objects, such as other vehicles, terrain, animals, balloons, debris, power lines, trees and leaves, weather formations, and so on. The system may inform other vehicles of the positions, headings, and velocities of vehicles and objects directly through transmitted signals or through a communication station. The communication station may be a ground tower that receives and transmits traffic data.

The system may also include the ability to control the ownship vehicle to make an evasion maneuver to avoid an object or another vehicle. In some examples, the system may be able to instruct/command the other vehicle to make an evasive maneuver to avoid the ownship vehicle.

The techniques of this disclosure may be implemented in a device or article of manufacture including a computer-readable storage medium. The term "processing circuitry," as used herein (e.g., processing circuitry 130, 230, and 330 in FIGS. 1-3) may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

The radar systems of FIGS. 1-18 may include one or more memory devices that include any volatile or non-volatile media, such as a RAM, ROM, non-volatile RAM (NVRAM), electrically erasable programmable ROM (EEPROM), flash memory, and the like. The one or more memory devices may store computer readable instructions that, when executed by processing circuitry, cause the processing circuitry to implement the techniques attributed herein to processing circuitry.

Elements of the processing circuitry and/or the transceiver may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of the processing circuitry and/or the transceiver as in any of the examples herein may be implemented as a device, a system, an apparatus, and may embody or implement a method of receiving surveillance signals and predicting future vehicle maneuvers.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas). An "aircraft" as described and claimed herein may include any crewed or uncrewed craft (e.g., a UAV, flying robot, or automated cargo or parcel delivery drone or other craft).

The ownship vehicle may be any mobile object or remote object including a system for detecting objects and other vehicles. In some examples, the ownship vehicle may be an aircraft such as a helicopter or a weather balloon. In yet other examples, the ownship vehicle may include a land vehicle such as an automobile or a water vehicle such as a ship. The ownship vehicle may be a manned vehicle or an unmanned vehicle, such as a drone, a remote-control vehicle, or any suitable vehicle without any pilot or crew on board.

The ownship vehicle may include equipment for determining the information included in the surveillance data. For example, the ownship vehicle may include satellite navigation equipment such as a GNSS or any other suitable means for determining the location of the ownship vehicle. The ownship vehicle may include processing circuitry for determining the speed, velocity, bearing, and course of the ownship vehicle using, for example, satellite navigation, a compass, flight plan data, and/or any other suitable equipment. The processing circuitry in the ownship vehicle may determine the course of the ownship vehicle using the current trajectory of the ownship vehicle along with the flight plan and destination of ownship vehicle.

In one example, a system is configured to mount on an ownship vehicle, wherein the system includes an FMCW phased-array radar device configured to transmit radar signals and receive returned radar signals. The system also includes a surveillance transponder configured to transmit surveillance signals indicating a position of the ownship vehicle and receive surveillance signals from another vehicle. The system further includes processing circuitry configured to detect an object based on the returned radar signals and determine the position of the other vehicle based on the received surveillance signals.

In some examples of the system, the FMCW phased-array radar device includes a transmission array of antenna elements configured to transmit the radar signals and a receive array of antenna elements configured to receive the returned radar signals.

In some examples of the system, the system further includes a positioning device configured to receive positioning signals, wherein the processing circuitry is further configured to determine the position of the ownship vehicle based on the positioning signals.

In some examples of the system, the system further includes at least one attitude sensor configured to generate an attitude signal, wherein the processing circuitry is configured to determine a pitch of the vehicle, a roll of the vehicle, or a yaw of the vehicle based on the attitude signal.

In some examples of the system, the FMCW phased-array radar device further includes a first panel configured to mount on the ownship vehicle at a first location in a first direction. The first panel includes a first transmission array of antenna elements configured to transmit radar signals and a first receive array of antenna elements configured to receive returned radar signals. The FMCW phased-array radar device includes a second panel configured to mount on the ownship vehicle at a second location in a second direction. The second panel includes a second transmission array of antenna elements configured to transmit radar signals and a second receive array of antenna elements configured to receive returned radar signals.

In some examples of the system, the processing circuitry is further configured to determine a position of the object based on the first location, the second location, the first direction, and the second direction.

In some examples of the system, the processing circuitry is further configured to cause the ownship vehicle to take an evasive maneuver based on the position and/or velocity of the object or the position and/or velocity of the other vehicle.

In some examples of the system, the system further includes a memory device configured to store expected characteristics of objects, wherein the processing circuitry is configured to detect the object based on the returned radar signals by at least comparing actual characteristics of the returned radar signals to the expected characteristics of objects.

In some examples of the system, the FMCW phased-array radar device is further configured to receive weather signals, and wherein the processing circuitry is further configured to determine weather conditions based on the received weather signals.

In some examples of the system, the surveillance transponder is further configured to transmit display signal to a control system to cause a display device of the control system to display data relating to the position of the ownship vehicle, the object, and the position of the other vehicle.

In some examples of the system, the phased-array radar device includes an FMCW digital active phased array radar device.

In some examples of the system, the processing circuitry is further configured to determine a velocity vector of the other vehicle based on the received surveillance signals.

In some examples of the system, the processing circuitry includes a common signal and data processing circuitry that processes both data from the phased-array radar device and data from the surveillance transponder.

In some examples of the system, the phased-array radar device may include single-forward looking only, forward and side looking, forward, side, and rear looking, or full three hundred sixty degree looking.

In some examples of the system, one of the sensors may be configured to operate as a master unit, collect data from the other sensors, and coordinate sensor operations.

In some examples of the system, antennas of the phased-array radar device may be co-located with the processing circuitry and/or located at other locations in or on the ownship vehicle. The other locations in or on the ownship vehicle include, but are not limited to a nose, wingtip, tail, and/or top of the ownship vehicle.

In some examples of the system, the data indicating a position of the other vehicle is traffic data.

In some examples of the system, wherein the traffic data is shared with a third vehicle. The data indicating the position of the other vehicle is shared among airborne systems regarding uncooperative airborne systems (non-transponder equipped aircraft).

In some examples of the system, wherein the traffic data is collected from the phased-array radar device and surveillance transponder and evaluated by an SAA subsystem. The SAA subsystem may be configured to develop flight position history, range, and range rate relative to other airborne aircraft. The SAA subsystem may be further configured to determine the necessity of avoidance maneuver and to issue appropriate actionable commands.

In some examples of the system, wherein the traffic data, cooperative and non-cooperative, is displayed to the "ownship" operator for safe airspace operation displaying cooperative vehicle information (active transponder on the other vehicle) and non-cooperative aircraft information. The cooperative vehicle information may include ICAO address, Mode-S identification, position, heading, velocity, and altitude of the other vehicle. The non-cooperative vehicle information may include non-cooperative temporary identification, azimuth, elevation, velocity, range from the ownship vehicle, and the latitude and longitude computed from ownship GNSS location of the other vehicle.

In one example, a method includes transmitting radar signals and receiving returned radar signals. The method further includes transmitting surveillance signals indicating a position of an ownship vehicle. The method also includes receiving surveillance signals from another vehicle. The method includes detecting an object based on the returned radar signals and determining the position of the other vehicle based on the received surveillance signals.

In some examples of the method, the method includes receiving positioning signals and determining the position of the ownship vehicle based on the positioning signals.

In some examples of the method, the method includes an attitude sensor and determining a pitch of the vehicle, a roll of the vehicle, or a yaw of the vehicle based on the attitude signal.

In some examples of the method, the method includes causing the ownship vehicle to take an evasive maneuver based on the position and/or velocity of the object or the position and/or velocity of the other vehicle.

In some examples of the method, the method includes storing expected characteristics of objects and detecting the object based on the returned radar signals by at least comparing actual characteristics of the returned radar signals to the expected characteristics of objects.

In some examples of the method, the method includes receiving weather signals and determining weather conditions based on the received weather signals.

In some examples of the method, the method includes determining a velocity vector of the other vehicle based on the received surveillance signals.

In some examples of the method, the method includes processing both data from the phased-array radar device and data from the surveillance transponder.

In some examples of the method, the method includes collecting, at a master sensor, data from other sensors, and coordinating, at the master sensor, sensor operations.

In some examples of the method, the method includes sharing traffic data with a third vehicle.

In some examples of the method, the method includes developing flight position history, range, and range rate relative to other airborne aircraft.

In some examples of the method, the method includes determine the necessity of avoidance maneuver and to issue appropriate actionable commands.

In some examples of the method, the method includes displaying to the "ownship" operator for safe airspace operation displaying cooperative vehicle information (active transponder on the other vehicle) and non-cooperative aircraft information. The cooperative vehicle information may include ICAO address, Mode-S identification, position, heading, velocity, and altitude of the other vehicle. The non-cooperative vehicle information may include non-cooperative temporary identification, azimuth, elevation, velocity, range from the ownship vehicle, and the latitude and longitude computed from ownship GNSS location of the other vehicle.

The foregoing examples may be implemented in any combination or implemented separately.

Various illustrative aspects of the disclosure are described above. These and other aspects are within the scope of the following claims.

What is claimed is:

1. A system configured to mount on an ownship vehicle, the system comprising:
   a single integrated electronics package;
   a phased-array radar device configured to transmit radar signals and receive returned radar signals;
   a surveillance transponder configured to receive surveillance signals from another vehicle;
   a single memory device configured to store tracking data for cooperative and non-cooperative targets; and
   processing circuitry configured to:
      detect an object based on the returned radar signals, wherein the single memory device is configured to store tracking data for the object; and determine a position of the other vehicle and a velocity vector of the other vehicle based on the received surveillance signals,
  wherein the single memory device is configured to store the position and velocity vector of the other vehicle, and
  wherein the processing circuitry includes common signal and data processing circuitry configured to:
    process data from the phased-array radar device; and
    process data from the surveillance transponder,
  wherein the phased-array radar device, the surveillance transponder, the single memory device, and the processing circuitry are part of the single integrated electronics package.

2. The system of claim 1, wherein the processing circuitry is further configured to:
  determine a fused track of the object or a fused track of the other vehicle by fusing data from the returned radar signals and data from the received surveillance signals;
  determine that the fused track of the object or the fused track of the other vehicle crossed a protective boundary around the ownship vehicle;
  determine an evasive maneuver based on determining that the fused track of the object or the fused track of the other vehicle crossed the protective boundary around the ownship vehicle; and
  cause a control system to conduct the evasive maneuver.

3. The system of claim 1, further comprising a positioning device configured to receive positioning signals, wherein the processing circuitry is further configured to determine the position of the ownship vehicle based on the positioning signals.

4. The system of claim 1, further comprising at least one attitude sensor configured to generate an attitude signal, wherein the processing circuitry is configured to determine a pitch of the ownship vehicle, a roll of the ownship vehicle, or a yaw of the ownship vehicle based on the attitude signal.

5. The system of claim 1, wherein the phased-array radar device comprises:
  a first panel configured to mount on the ownship vehicle at a first location in a first direction, wherein the first panel includes:
    a first transmission array of antenna elements configured to transmit the radar signals; and
    a first receive array of antenna elements configured to receive the returned radar signals; and
  a second panel configured to mount on the ownship vehicle at a second location in a second direction, wherein the second panel includes:
    a second transmission array of antenna elements configured to transmit the radar signals; and
    a second receive array of antenna elements configured to receive the returned radar signals.

6. The system of claim 5, wherein the processing circuitry is further configured to:
  operate as a controller for the system to receive and combine the returned radar signals of multiple-panel configurations; and
  determine a position of the object based on the first location, the second location, the first direction, and the second direction.

7. The system of claim 1, wherein the processing circuitry is further configured to cause the ownship vehicle to take an evasive maneuver based on a position of the object or the position of the other vehicle.

8. The system of claim 1, wherein the single memory device is configured to store expected characteristics of objects, wherein the processing circuitry is configured to detect the object based on the returned radar signals by at least comparing actual characteristics of the returned radar signals to the expected characteristics of objects.

9. The system of claim 1,
  wherein the phased-array radar device is configured to receive weather signals, and
  wherein the processing circuitry is further configured to determine weather conditions based on the received weather signals.

10. The system of claim 1, wherein the surveillance transponder is further configured to transmit display signal to a control system to cause a display device of the control system to display data relating to the position of the ownship vehicle, the object, and the position of the other vehicle.

11. The system of claim 1, wherein the processing circuitry is further configured to determine the velocity vector of the other vehicle based on the received surveillance signals.

12. The system of claim 1, further comprising:
  a control system including a display device; and
  one or more sensors, wherein a sensor of the one or more sensors is configured to operate as a master unit by at least:
    collecting data from other sensors of the one or more sensors; and
    coordinate operations of the other sensors of the one or more sensors; and
    transmit display signals indicating the collected data to the control system to cause the display device to display:
      a position of the ownship vehicle, and
      a position of the object or the position of the other vehicle.

13. The system of claim 1, wherein the processing circuitry is configured to cause the surveillance transponder to transmit traffic data to a third vehicle, wherein the traffic data indicates a position of the object.

14. A method comprising:
  transmitting, by a phased-array radar device of a single integrated electronics package, radar signals;
  receiving, by the phased-array radar device, returned radar signals;
  transmitting, by a surveillance transponder of the single integrated electronics package, surveillance signals indicating a position of an ownship vehicle;
  receiving, by the surveillance transponder, surveillance signals from another vehicle;
  storing, to a single memory device of the single integrated electronics package, tracking data for cooperative and non-cooperative targets;
  detecting, at processing circuitry of the single integrated electronics package, an object based on the returned radar signals;
  storing, to the single memory device, tracking data for the object; and
  determining, at the processing circuitry, a position of the other vehicle and a velocity vector of the other vehicle based on the received surveillance signals; and
  storing, to the single memory device, the position and velocity vector of the other vehicle.

15. The method of claim 14, further comprising:
  determining, at the processing circuitry, a fused track of the object or a fused track of the other vehicle by fusing data from the returned radar signals and data from the received surveillance signals;

determining, at the processing circuitry, that the fused track of the object or the fused track of the other vehicle crossed a protective boundary around the ownship vehicle;

determining, at the processing circuitry, an evasive maneuver based on determining that the fused track of the object or the fused track of the other vehicle crossed the protective boundary around the ownship vehicle; and causing, by the processing circuitry, a control system to conduct the evasive maneuver.

16. The method of claim 14, further comprising:

generating, at an attitude sensor, an attitude signal; and determining, at the processing circuitry, a pitch of the ownship vehicle, a roll of the ownship vehicle, or a yaw of the ownship vehicle based on the attitude signal.

17. The method of claim 14, further comprising causing, at the processing circuitry, an ownship vehicle to take an evasive maneuver based on a position of the object or the position of the other vehicle, wherein the ownship vehicle includes the phased-array radar device, the surveillance transponder, and the processing circuitry.

18. The method of claim 14; further comprising:

generating fused tracks based on returned radar signals and received surveillance signals; and transmitting display signals of the returned radar signals, the received surveillance signals, and the fused tracks to a control system to cause a display device of the control system to display:
a position of the ownship vehicle, and
a position of the object or the position of the other vehicle.

19. The method of claim 14, wherein detecting the object based on the returned radar signals comprises detecting, at common processing circuitry for the returned radar signals and the received surveillance signals, the object based on the returned radar signals; and wherein determining the position of the other vehicle comprises determining, at the common processing circuitry for the returned radar signals and the received surveillance signals, the position of the other vehicle based on the received surveillance signals.

20. A system configured to mount on an ownship vehicle, the system comprising:

a single integrated electronics package;

a phased-array radar device configured to transmit radar signals and receive returned radar signals;

a surveillance transponder configured to receive surveillance signals from another vehicle;

a positioning device configured to receive positioning signals;

a single memory device configured to store tracking data for cooperative and non-cooperative targets; and processing circuitry configured to:
determine the position of the ownship vehicle based on the positioning signals;
detect an object based on the returned radar signals, wherein the single memory device is configured to store tracking data for the object;
determine a position of the other vehicle and a velocity vector of the other vehicle based on the received surveillance signals or the returned radar signals, wherein the single memory device is configured to store the position and velocity vector of the other vehicle; and
cause the ownship vehicle to take an evasive maneuver based on a position of the object or the position of the other vehicle,
wherein the processing circuitry includes common signal and data processing circuitry configured to:
process data from the phased-array radar device;
process data from the positioning device; and
process data from the surveillance transponder,
wherein the phased-array radar device, the surveillance transponder, the positioning device, the single memory device, and the processing circuitry are part of the single integrated electronics package.

* * * * *